United States Patent
Deen et al.

(10) Patent No.: US 9,769,510 B2
(45) Date of Patent: Sep. 19, 2017

(54) SYSTEM AND METHOD FOR CREATING AND MANAGING INDIVIDUAL USERS FOR PERSONALIZED TELEVISION AND BLENDED MEDIA SERVICES

(71) Applicant: UXP Systems Inc., Toronto (CA)

(72) Inventors: Jay A. Deen, Toronto (CA); Gemini Waghmare, Toronto (CA); Jerry Wang, Markham (CA); Lucia Rozborova, Toronto (CA)

(73) Assignee: UXP Systems Inc., Toronto (CA)

( * ) Notice: Subject to any disclaimer, the term of this patent is extended or adjusted under 35 U.S.C. 154(b) by 49 days.

(21) Appl. No.: 14/225,064

(22) Filed: Mar. 25, 2014

(65) Prior Publication Data

US 2015/0281754 A1  Oct. 1, 2015

(51) Int. Cl.
| | | |
|---|---|---|
| *H04N 21/258* | (2011.01) | |
| *H04N 21/45* | (2011.01) | |
| *H04N 21/466* | (2011.01) | |
| *H04N 21/475* | (2011.01) | |
| *H04N 21/25* | (2011.01) | |

(Continued)

(52) U.S. Cl.
CPC ....... *H04N 21/25891* (2013.01); *H04N 21/25* (2013.01); *H04N 21/254* (2013.01);
(Continued)

(58) Field of Classification Search
None
See application file for complete search history.

(56) References Cited

U.S. PATENT DOCUMENTS

| 7,451,234 B1* | 11/2008 | Bonner | H04L 29/12066 709/220 |
|---|---|---|---|
| 2004/0073915 A1* | 4/2004 | Dureau | 725/9 |

(Continued)

OTHER PUBLICATIONS

Lawler, Richard; Cox Cable launches personalized Contour experience with iPad app, 2TB tuner DVR; Aug. 7, 2013; retrieved Mar. 6, 2014 from http://www.engadget.com/2013/08/07/cos-cable-contour-6-tuner-dvr-ipad/.

(Continued)

*Primary Examiner* — Justin Shepard
(74) *Attorney, Agent, or Firm* — Brett J. Slaney; Blake, Cassels & Graydon LLP

(57) ABSTRACT

There is provided a method of allowing members of a television viewing household to create individual user profiles using a plurality of input devices, the method comprising: determining the context of a user enrollment session; using the context to adapt a user enrollment to minimize operations required to complete an enrollment of the user; and generating a user hierarchy based on relationships between a plurality of user profiles according to a relationship with a television distributor and relationships between the plurality of user profiles. There is also provided a method of allowing television (TV) distributor administrators to manage user profiles and user settings, the method comprising: enabling creation of at least one administrative user; enabling the at least one administrative user to perform at least one of managing, creating, and viewing user profiles created for TV viewing households according to an administrative level assigned to the at least one administrative user; and enabling the at least one administrative user to configure settings related to an enrollment of a user.

21 Claims, 18 Drawing Sheets

(51) Int. Cl.
    *H04N 21/6334*    (2011.01)
    *H04N 21/633*     (2011.01)
    *H04N 21/254*     (2011.01)
    *H04N 21/2547*    (2011.01)
    *H04N 21/63*      (2011.01)
    *H04N 21/41*      (2011.01)

(52) U.S. Cl.
    CPC ....... *H04N 21/258* (2013.01); *H04N 21/2541* (2013.01); *H04N 21/2542* (2013.01); *H04N 21/2547* (2013.01); *H04N 21/25808* (2013.01); *H04N 21/25816* (2013.01); *H04N 21/4126* (2013.01); *H04N 21/45* (2013.01); *H04N 21/4508* (2013.01); *H04N 21/4516* (2013.01); *H04N 21/4532* (2013.01); *H04N 21/4667* (2013.01); *H04N 21/4755* (2013.01); *H04N 21/63* (2013.01); *H04N 21/633* (2013.01); *H04N 21/6334* (2013.01)

(56) References Cited

U.S. PATENT DOCUMENTS

| | | | |
|---|---|---|---|
| 2009/0187944 A1* | 7/2009 | White et al. | 725/46 |
| 2009/0241153 A1* | 9/2009 | Campagna et al. | 725/110 |
| 2011/0302117 A1* | 12/2011 | Pinckney et al. | 706/12 |
| 2013/0198179 A1* | 8/2013 | Arnott et al. | 707/736 |
| 2014/0066015 A1* | 3/2014 | Aissi | H04W 12/06 455/411 |
| 2014/0153031 A1* | 6/2014 | Toyamasaki | G07C 9/00 358/1.14 |
| 2015/0105017 A1* | 4/2015 | Holmquist et al. | 455/41.2 |

OTHER PUBLICATIONS

Perez, Sarah; "Netflix User Profiles Start Appearing on Apple TV"; Jul. 30, 2013; retrieved Mar. 6, 2014 from http://techcrunch.com/2013/07/30/netflix-users-profiles-start-appearing-on-apple-tv/.

* cited by examiner

SYSTEM AND METHOD FOR CREATING AND MANAGING INDIVIDUAL USERS FOR PERSONALIZED TELEVISION AND BLENDED MEDIA SERVICES

TECHNICAL FIELD

The following relates to systems and methods for creating and managing individual users for personalized television and blended media services.

DESCRIPTION OF THE RELATED ART

There exist several systems that provide for the personalization of users in a television (TV) viewing household. For example, one prior system uses an electronic tablet application to allow the primary account owner of a TV subscription to create multiple additional user profiles in the household for the purpose of allowing for the generation of personalized recommendations and personalized TV preferences for each profile. Another prior system presents a stored list of household e-mail accounts previously known to the TV service provider, presuming that each e-mail address represented a member of that household who may want to personalize their experience. Yet another prior system presents a user with a "who's watching?" prompt, thereby encouraging a user to specifically identify themselves and others in the household by creating profiles which are then used to generate user-level recommendations based on prior viewing habits.

While allowing for user profiles to be created for a service, the aforementioned systems can be difficult to incorporate into existing telecommunication and cable environments, particularly for managing user profiles and handling the various relationships between users in a TV viewing household.

SUMMARY

There is provided a method of allowing members of a television viewing location to create individual user profiles using a plurality of input devices, the method comprising: determining the context of a user enrolment session; using the context to adapt a user enrollment to minimize operations required to complete an enrolment of the user; and generating a user hierarchy based on relationships between a plurality of user profiles according to a relationship with a television distributor and relationships between the plurality of user profiles.

There is also provided a method of allowing television distributor administrators to manage user profiles and user settings, the method comprising: enabling creation of at least one administrative user; enabling the at least one administrative user to perform at least one of managing, creating, and viewing user profiles created for television viewing locations according to an administrative level assigned to the at least one administrative user; and enabling the at least one administrative user to configure settings related to an enrolment of a user.

There are also provided computer readable media and systems configured for performing the above methods.

BRIEF DESCRIPTION OF THE DRAWINGS

Embodiments will now be described by way of example only with reference to the appended drawings wherein.

DETAILED DESCRIPTION

Figure 1:
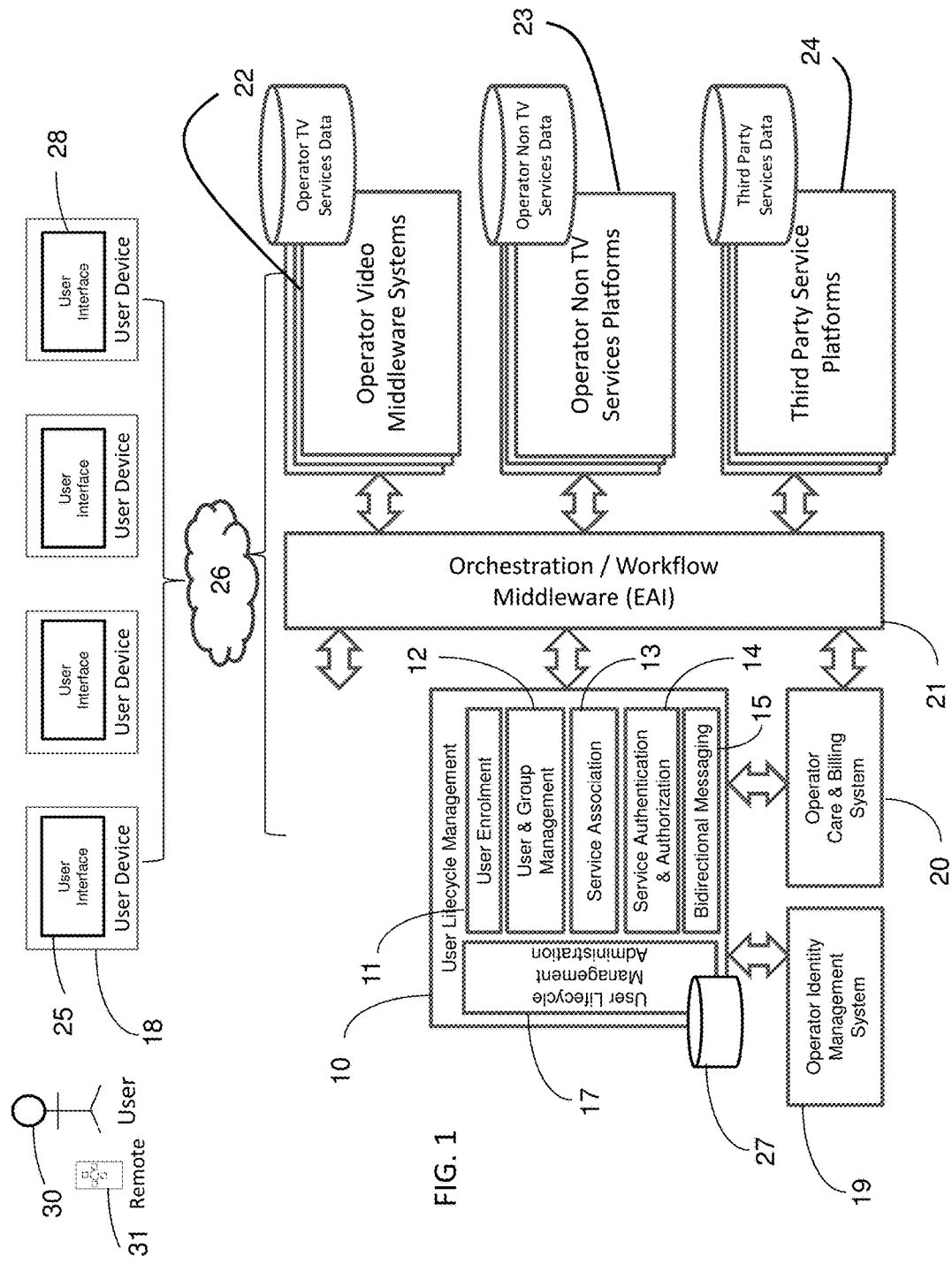
FIG. 1. is a block diagram showing various components of a system for creating and managing individual users for personalized television and blended media services in a TV distribution environment.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

As discussed above, collectively, prior user management systems may be difficult to use by individual users and very complex and expensive to implement in telecommunications and cable television environments that are not designed to manage user profiles. It has been found that such systems fail to provide a plurality of methods for creating user profiles, fail to accommodate for the various relationships between users in a TV viewing household that may dictate user privileges, privacy and security; and fail to provide a seamless extensibility of these user profiles beyond traditional television services and into new services, including internet based video services, internet-based non video services and television operator based non-video services. It has been recognized that usability and flexibility for end users, and the economically viable extensibility of platforms, are of particular importance to distributors of TV services.

It has also been found that such prior systems typically rely heavily on the concept of a primary user, which is the individual who is responsible for the payment of the invoice provided by the TV program distributors for TV services. Because of the unique financial relationship between this primary user and the TV service distributor, this primary user is granted the permission to create additional secondary users in the household. These prior systems do not provide the primary user the ability to selectively delegate this unique permission, or waive the need to provide permission credentials for specific user management activities to alleviate the need for this primary user to be uniquely involved in user creation and management activities.

Prior systems have also been found to follow a specific set of steps for the enrolment of users for the purposes of personalization, and often restrict enrolment to specific input channels such as TV distributor websites. These steps usually include a verification of user data that provides an indication of the financial account associated with the user followed by the creation of one or more user profiles, where a user profile is based on a username or an e-mail address, but not both. In many cases, the contextual information provided by a user's input device, or by a user's prior authentication to a specific application, may dynamically change the amount data needed for the enrolment of users. Prior systems have also been found to not dynamically adapt or offer a plurality of enrolment processes based on this context. There is a need, where possible, to provide for a plurality of methods and input channels by which to enroll users, where registration steps may be removed to simplify enrolment processes, depending on the context provided by the enrolment method.

These prior attempts at user lifecycle management do not have the capability of permitting the association of other additional cable and telecom operator services to a single user's profile via an identity federation process. For example, such additional services may include home automation, voice calling, messaging, personal content, billing and account services and other operator-based services, to name a few. By allowing an enrolled user to seamlessly federate their created profile, or identity, with other services they consume that are tied to additional operator identities associated with that user, the breadth of features and services individual users may enjoy as a result of creating a user profile should increase. With the increasing need to converge cable and telecom services into blended experiences to achieve differentiation, the utility of these prior systems creates a disadvantage without this functionality.

Moreover, it has been recognized that these prior user lifecycle management attempts do not have the capability of permitting the association of other additional non-cable and telecom operator services to a single user's profile via an identity federation process. For example, these other services may include weather, news, traffic, sports applications, over-the-top programmed video content, and other non-operator services, to name a few. By allowing an enrolled user to seamlessly federate their created profile, or identity, with other services they consume that are tied to additional external identities associated with that user, the breadth of features and services individual users may enjoy as a result of creating a user profile should increase. With the advent of internet-based television and the increasing breadth of services made available to those users, the utility of these prior systems creates a further disadvantage without this functionality.

The prior user lifecycle management attempts have also been found to be lacking in the ability to provide users with a flexible number of means by which they may create and manage their user profiles. Increasingly, users watch television while browsing a secondary device such as a smartphone or tablet. Thus, there is a particular need to allow for the creation of users with a varied number of user apparatus, including television remote controls and tablet and computer devices using touchscreens and keyboards. There is also a need to allow the user to combine various user apparatus simultaneously in user creation and management. For example, a user may initiate a user profile enrolment process on a television screen using a television remote control, but then elect to interact with a tablet computer and television contemporaneously whereby the tablet becomes an input device while the television remains the display device. Accordingly, there is a need for a user lifecycle management system that can provide improved user enrolment and management processes by linking multiple devices to one user management interaction.

The prior user management systems are also found to be lacking a method for an authorized third party such as a customer service representative to create, view and manage user on a household administrator's behalf via an administrative user interface. In order to ease the burden of the creation and management of individual user profiles, it may be necessary for the user to call their television distributor for assistance in creating or managing user profiles. Thus, there is a particular need for a secure and flexible interface that allows an authorized administrator to access a household hierarchy on a user's behalf for third party user lifecycle management actions.

Similarly, there is a need by which to present the household hierarchy and users in a visually representative manner that intuitively depicts, to authorized users, the various users in the household, their hierarchical privileges and relationship, and their services and features that are associated to their profile. Accordingly, there is also a need for a single and comprehensive visual representation of a household hierarchy and the services and features of those users. This single and visual representation of the household user hierarchy should be capable of being presented simultaneously and seamlessly across user screens and devices. There is also a need for the secure navigation of the household hierarchy interface and user profiles, respecting the specific permissions and privileges of the user who is navigating the hierarchy.

The increasing importance of personalization in television and media services has created a gap in enterprise information technology systems as it relates to the implementation of user lifecycle management systems. Prior user management systems lack management interfaces, which allow the operator to define global characteristics and policies for personalization. For example, an operator may wish to universally limit the number of total users allowed in a given household, and also separately limit the number of simultaneous logins at any one time by setting these parameters in a global settings user interface. Thus, there is a need for the operator to have access to an administrative back end for the easy configuration of system settings.

Accordingly, there is a need for a user lifecycle management system that simplifies the creation and management of multiple users in a viewing household, specifically for the purposes of personalized TV and blended media services. This user lifecycle management system should provide a plurality of methods for user enrolment and dynamically initiate user enrolment flows based on the context of a user. The flexibility and intelligence and this system should also be more easily implemented in operator systems, and be efficient and appealing in operation by users and TV distributors.

For example, an individual should be able to turn on their television, and by navigating to a user profile creation screen, be able to initiate and complete the process of creating a user profile, and have the option to use either the remote control, or use a companion touch screen interface or keyboard and internet-enabled device to assist in the completion of the process. Similarly, should the user encounter difficulties, a customer service representative acting on their behalf should be able to authenticate to an administration interface to complete the enrolment process if needed.

There is also a need for that user to establish privacy settings for their profile, if needed, in order that other members of the TV viewing household are unable to view their profile. Given the possibility that there are minors in the household for which privacy is either not relevant or a risk unto itself, a head-of-household should be able to administer how privacy settings are established, and who can use them. This hierarchical complexity should be presented, however, by a system, in an easy to understand manner.

There is also a need to allow the user to leverage the created profile as a springboard, or gateway to other personalized services. Having gone through the effort of creating an individual profile for television services, the profile, with appropriate credentials, may be used as an identifier to authenticate access other services for seamless presentation and consumption as part of the TV viewing experience.

It is accordingly an object of the following to provide a system that allows an authorized user in a TV viewing household to enroll one or more user profiles into a user lifecycle management system that processes, stores, manages and presents the enrolled users for the purpose of providing a personalized TV service, accessible on a plurality of devices.

It is another object of the following to enable a single authorized user to delegate and extend the authority of user enrolment and management to other users within the TV viewing household.

It is yet another object of the following to enable a plurality of methods of user enrolment; whereby each method of user enrolment is assisted by the underlying system to optimize the ease of enrolment based on the context (device or authentication) of the user's enrolment method.

It is still another object of the following to enable the user to leverage the created user profile for seamless access to other cable and telecom operator services and features, and for seamless access to internet-based services by providing an identity federation capability that will allow the linking of this user profile to other operator and non-operator services.

It is another object of the following to simplify the user enrolment process for TV personalization by allowing the contemporaneous use of two devices simultaneously interacting with the invention for the creation of users.

It is yet another object of the following to provide a secure management interface for user enrolment and management to be done on a user's behalf by a credentialed representative of the cable or telecom operator (or a third party).

It is still another object of the following to dynamically generate a user-specific view of the entire hierarchy of a TV viewing group that visually depicts the hierarchy in order to simplify the management of the relationships between the operator and the users and the users themselves within the household.

It is another object of the following to provide a management and configuration interface to define global user lifecycle management settings that the cable or telecom operator wishes to implement via a graphical user interface to reduce the need for customized software development in order to accommodate the operator's desired policies.

In the following examples, it can be appreciated that the term "household" may refer to any location or premises (e.g., school, business, etc.) which is considered a TV viewing "group" and should not be limited to residential TV subscriptions.

Any one or more of the above-mentioned objects can be achieved by a user lifecycle management system. For example, such a user lifecycle management system can be configured to include a software application processing engine that enables a plurality of methods for enrolling, presenting and managing individual users in a household TV viewing group, where each user is consuming services from the same subscription. For example, a software application may query a database to retrieve any user profiles for a specific TV household viewing group. Based on query results, the software application platform sends data to a remote user device, such as a tablet, smartphone or television set top box, to enable the enrolment of user profiles in the database via a plurality of device input screens. The software platform can be configured to dynamically modify enrollment methods based on the user input apparatus, to accommodate for ease of use. The software application platform can also be configured to correlate users in a TV household viewing group in a multidimensional hierarchy, where a plurality of permissions and privileges may be assigned to a user profile based on their relationship with the TV service provider and based on their relationship with other members of the household. The software application includes a hierarchical processing engine, via which users can specify permissions and privileges for which profile that define these aforementioned relationships. The software platform can also be used to enforce privacy and security for each profile; whereby users may define credentials to govern access to their profiles, and each user's profile attributes may be governed according to privacy settings. The software application platform can furthermore provide an identity federation capability and processing engine for binding a plurality of services and features to a user profile. The software application platform can also be configured to generate a visual representation of the multidimensional hierarchy that is dynamically generated for the specific user profile who wishes to view it.

Accordingly, there is provided a system that provides user lifecycle management, which enables the members of a TV-viewing household to create a hierarchy of users; whereby each user may use a specifically created user profile to personalize their TV experience. Particularly, the system is configured for creating, presenting and managing a household hierarchy of TV-viewing users, where the hierarchical structure enforces specific policies for each user, while at the same time the system increases the breadth of personalized services and features available to each individual user in the hierarchy. The system described herein advantageously enables increased convenience and efficiency for TV operators and TV viewing users to create, navigate and manage these user profiles using a plurality of control devices.

System Configuration

Turning now to the figures, FIG. 1 is a block diagram of various components of an example of a configuration for a User Lifecycle Management system generally designated using numeral 10, as installed in a TV distributor's network and systems environment. Physically, the system 10 can be located in the TV distributor's data center, or another centrally located computing systems facility that can be remotely and securely accessed by the TV distributor. In this example, a number of user devices 18 are communicable with the system 10 via one or more networks 26. The user devices 18 include user interface system components 25 that enable user-to-system interactions, which may be located physically on the user device 18, or on the system 10, and accessed by the user device 18 in a secure and remote manner.

A User Enrolment application module 11 is initiated when a user seeks to create an individual user profile via a user interface 25. The user enrolment application module 11 determines whether it can automatically identify the billing account to which the user profile should be associated by either querying a user lifecycle management database 27, an operator identity management system 19, or the user device 18, each of which may provide the billing account context to the user enrolment sub-system 11. This pre-processing minimizes the steps in the user enrolment process if the billing account information can be derived with no manual interaction. If a billing account cannot be determined, a billing account association process is initiated by the user enrolment 11 sub-system whereby the user enrolment sub-system 11 will dynamically present an input screen to user interface 25 for the user 30 to enter the related billing account resident in operator care and billing system 20.

User enrolment subsystem 11 queries operator care and billing system 20 to verify the existence of the billing account following which user enrolment subsystem 11 uses an internal process engine to prompt the user 30 with a verification question to confirm that the user 30 is associated with the billing account resident in billing sub system 20.

User enrolment sub system 11 queries whether or not existing user profiles exist for the billing account resident in operator billing system 20, as it relates to the specific TV service being consumed and delivered via operator TV middleware systems 22. If pre-existing profiles are retrieved, data representing these profiles are sent by the user lifecycle management system 10 to the user interface 25 via the network 26 and optionally via a resident (orchestration/workflow) middleware system 21. User and Group management sub-system 12 can be used to provide a determination of whether more user profiles may be created by the user based on limits defined in a User Lifecycle Management Administration sub-system 17.

Should a user elect to create a profile via sending an input signal to User Enrolment sub system 11 via user interface 25, user enrolment 11 again uses its querying mechanism to determine if the user 30 is required to enter the account information or if user enrolment 11 can access this information via it's interfaces to user device 18, user lifecycle management database 27 or an operator identity management system 19.

User enrolment sub system 11 uses a dynamic device mapping capability to present the optimal user interface 25 based on the specific device type 18 being used for the user enrolment process. For example, if user device 19 is a TV screen controlled by the user 30 using a simple five-button remote control apparatus 31, user enrolment sub system 11 may present an enrolment interface that allows the user 30 to either use remote control apparatus 31, or to contemporaneously interact with the user enrolment sub system 11 via a more fully functional input device such as a tablet device-type user interface 28. In this case, a bi-directional messaging sub-system 15 is used to broker and transport data between a secondary user interface 28 and the primary user interface 25.

User enrolment sub system 11 may also invoke the user and group management 12 to determine the hierarchical placement of the enrolling user 30 in order to present this to the user 30 via the user interface 25. User and group management sub system 12 also detects any additional sub processes required for enrolment based on the user's placement in the hierarchy. For example, if the user 30 enrolling a profile is the head-of-household or primary user, user and group management sub system 12 may sent an input prompt to user interface 25 to verify the user. The input received by user and group management sub system 30 may be verified directly in user lifecycle management database 27 or via user lifecycle management system 11 interfaces to user device 18, operator identity management system 19 or operator TV middleware system 22 depending on where verification credentials are held. User and group management 12 also determines, based on policies configured in user lifecycle management system 10 via user lifecycle management administration sub system 17, what hierarchical privileges user 30 may configure for themselves and present an interface for input selection via user interface 25.

Following the enrolment of a user profile using user enrolment sub-system 11 and the management and configuration of that user profile using user and group management sub-system 12, the user may associate specific services resident in operator non-TV platform 23 and third party service platform 24 to their profile using service association sub-system 13. Service association 15 retrieves services associated with the relevant household's account data housed in billing system 20 and presents these to the user for association. Service association 13 leverages permissions in user and group management 12 to ensure that only credentialed users, as defined by the TV distributor using User Lifecycle Administration 17, may associate services to their profile. Once a user has associated services to their profile, the user profile and associated services are stored in ULM data store 27, where additional personalization attributes are stored to enable a personalized experience. For each service associated with a user's profile, service authentication and authorization 14 determines whether or not the user should provide additional service credentials (e.g.: passwords) to access the service, and prompts the user 30 via user devices 18 to input the appropriate credentials. Following the entry of these credentials, service authentication and authorization 14 verifies the accuracy of these credentials and, if correct, stores them securely as needed in ULM data store 27 to enable single sign on to services by user 30 to their services.

The components of the user lifecycle management system 10 as shown in FIG. 1 are just one illustrative example of a configuration or platform. It can be appreciated that the particular implementation of the systems may vary depending on the existing systems in place in a TV distributor environment:

In operation, the user lifecycle management system 10 may function as follows:

User Enrolment Mode

Figure 2A:
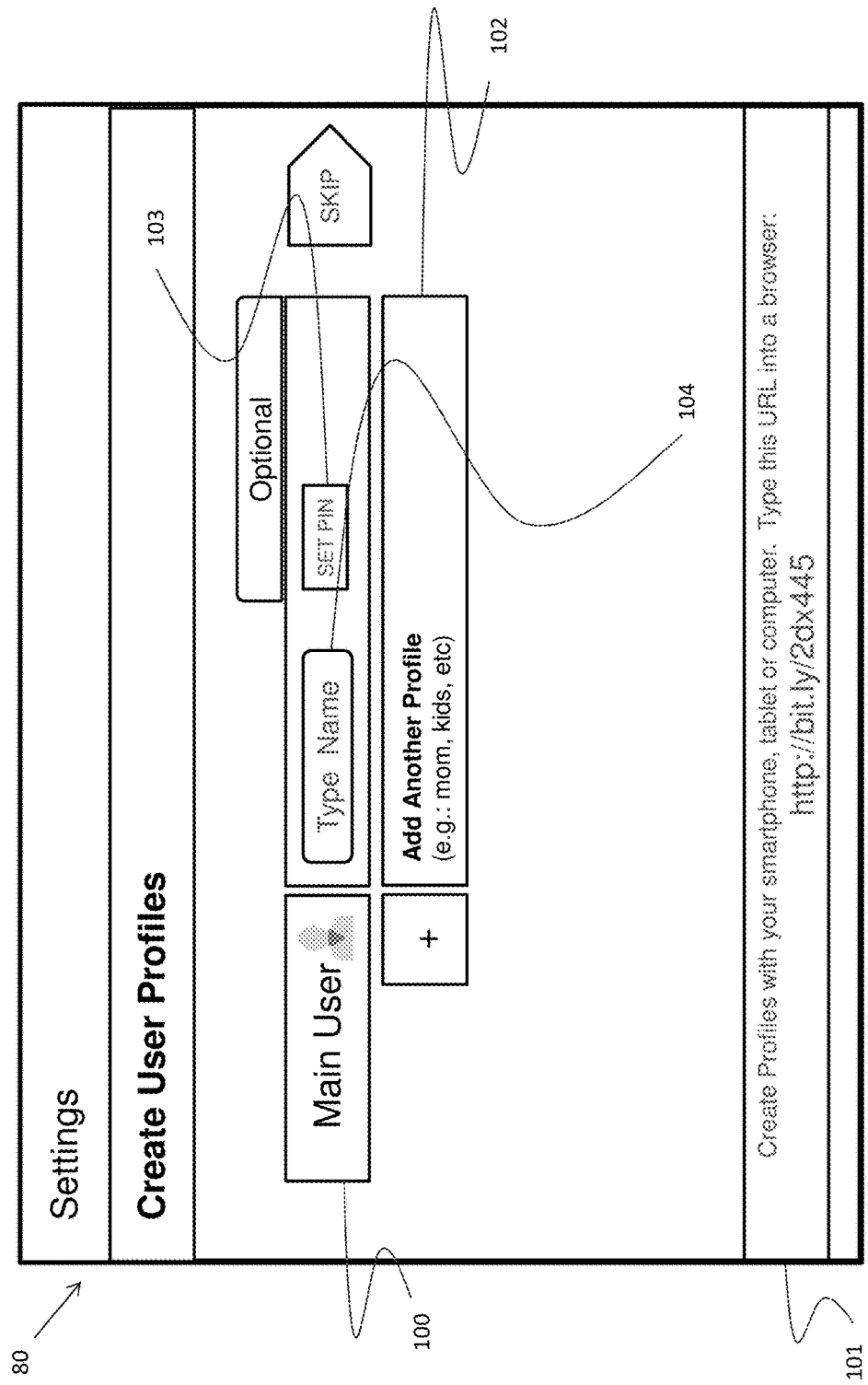
FIG. 2a shows a user enrolment sub system interface that appears on a television screen in one aspect of the system.

When a user wishes to create a user profile on a TV screen 25, a user enrolment screen 80, shown in FIG. 2a is presented. As the primary user has not been created, (in this example as determined by User enrolment 11—and described in further detail below in FIG. 2b), a TYPE NAME prompt to create this user is presented by user enrolment 11. Main user visual marker 100 depicts the user as the top of the household user hierarchy with a left-indented indicator, and input field 104 is presented by user enrolment 11 to prompt user 30 for input. Secondary profile visual marker 102 is shown with a pronounced left indentation to depict a lesser place in the hierarchy, and user enrolment 11 should not permit the creation of this profile until the primary user profile is created. A SET PIN visual marker 103 allows the establishment of user enrolment 11 privacy settings to be stored in ULM data store 27 for that profile. As user enrolment also detects the input source as a TV screen in this embodiment, user enrolment 11 dynamically generates and presents a URL in visual marker 101 to allow user enrolment using a companion device 28 contemporaneously.

Figure 2B:
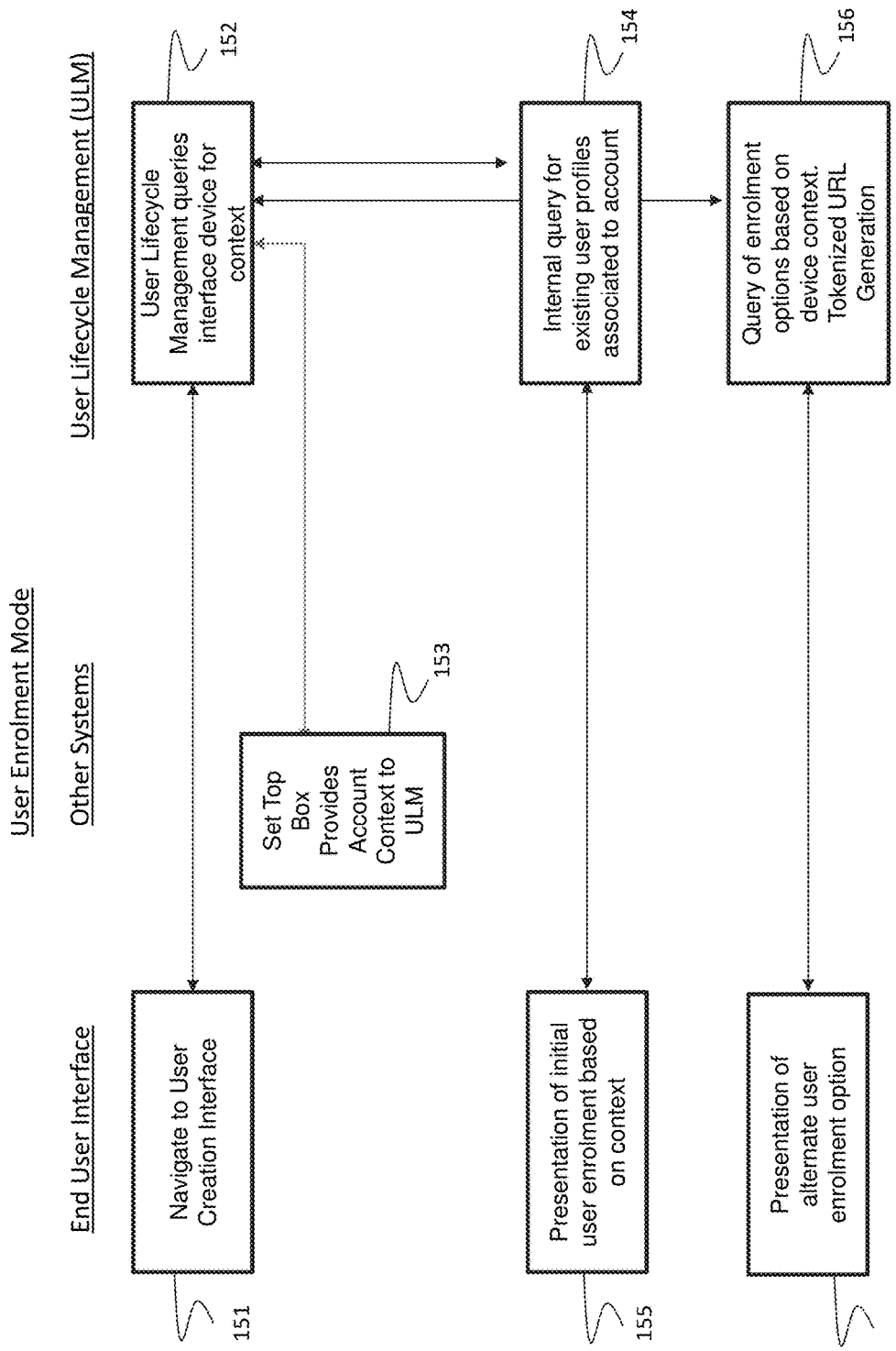
FIG. 2b is a flow diagram depicting user enrolment sub system processes to enable user enrolment in one aspect of the system.

FIG. 2b shows a user enrolment subsystem process that may be executed in support of the user enrolment presentation interface and input processes depicted in FIG. 2a. As shown in FIG. 2b, A user navigates to a television-based enrolment interface in step 151 which then triggers a query by the user lifecycle management system at 152 to attempt to determine if it can query and retrieve the billing account information for the interaction from the set top box at 153. The user lifecycle management retrieves the account information and then performs a subsequent query to determine if any pre-existing profiles are associated with the account at 154. Based on the data returned, which in this embodiment shows no profiles have been created, a prompt to create the primary, or top-level user in a household hierarchy is presented at 155. This is visually presented in 100, 104 as shown in FIG. 2a. It may be noted that in this process, the need for the end user to input account information was dynamically removed by user enrolment sub-system 11 based on the successful retrieval of the account information in step 153.

User enrolment sub-system 11 also determines that the user interface is a TV set in the initial navigation step 151, and queries enrolment options for the TV. In step 156, user enrolment 11 provides a tokenized URL that presents to the user interface a URL 101 for a secondary input, that is then presented on the TV screen in step 157.

Secondary Device Enrolment

Figure 3A:
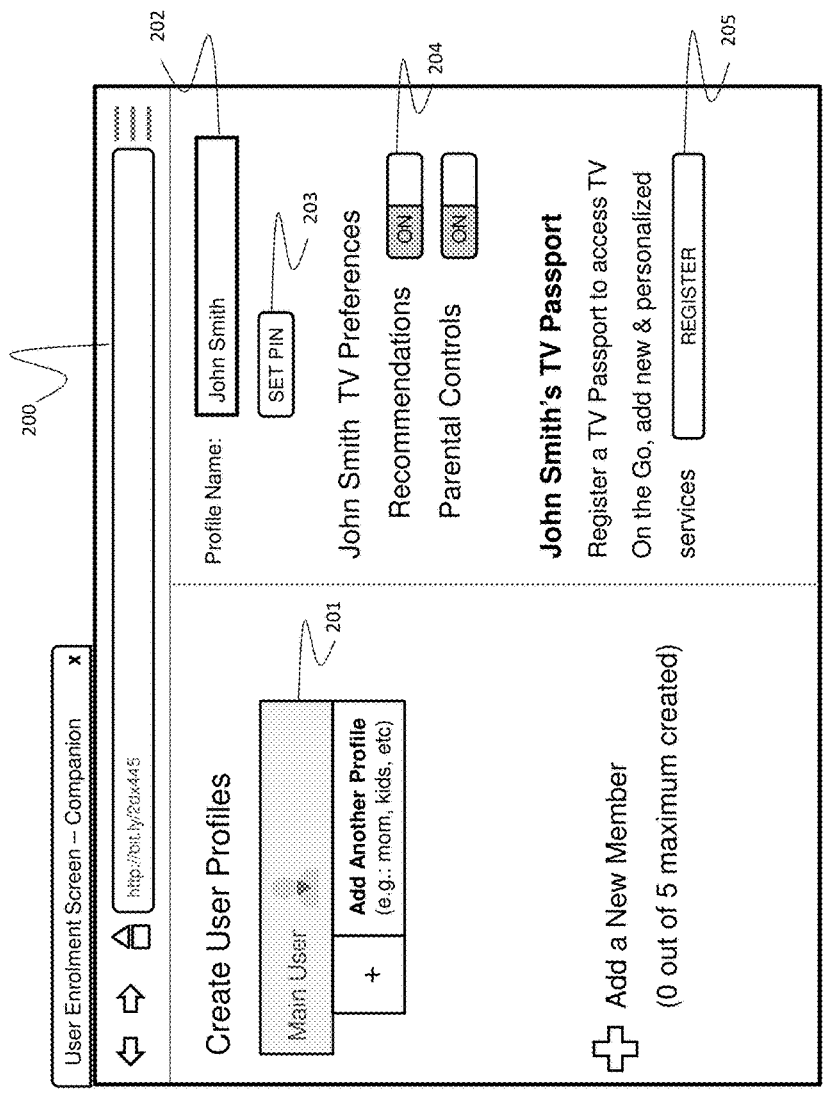
FIG. 3a. shows a secondary enrolment interface that contemporaneously interacts with a primary user enrolment interface via the user enrolment sub system in one aspect of the system.

The user enrolment sub-system 11 provides for an optimized method of user enrolment based on devices available to the end user. As shown in FIG. 2a, the example shown provides for the use of a companion, or secondary device 18 to assist with the enrolment process when the primary enrolment interface has limited input options, as with a typical TV and remote control. Secondary enrolment prompt 101 which is a tokenized URL generated by enrolment sub-system 11 allows a user to use a computer, tablet or smartphone apparatus to navigate to a web browser URL 200 and access an interface as shown in FIG. 3a for ease of enrolment.

Based on this secondary input device context, user enrolment sub-system 11 presents an optimized interface for input of data. With a more flexible input device apparatus such as a computer mouse and user enrolment 11 presents the user with information such as the user hierarchy 201 and a specific input field for enrolment 202. In addition to this, and in contrast to FIG. 2a, the user enrolment subsystem 11 also presents more information where applicable, such as additional profile preference information 204 and the opportunity to extend the profile and add services to the profile via the addition of an e-mail address or other user identifier 205.

Figure 3B:
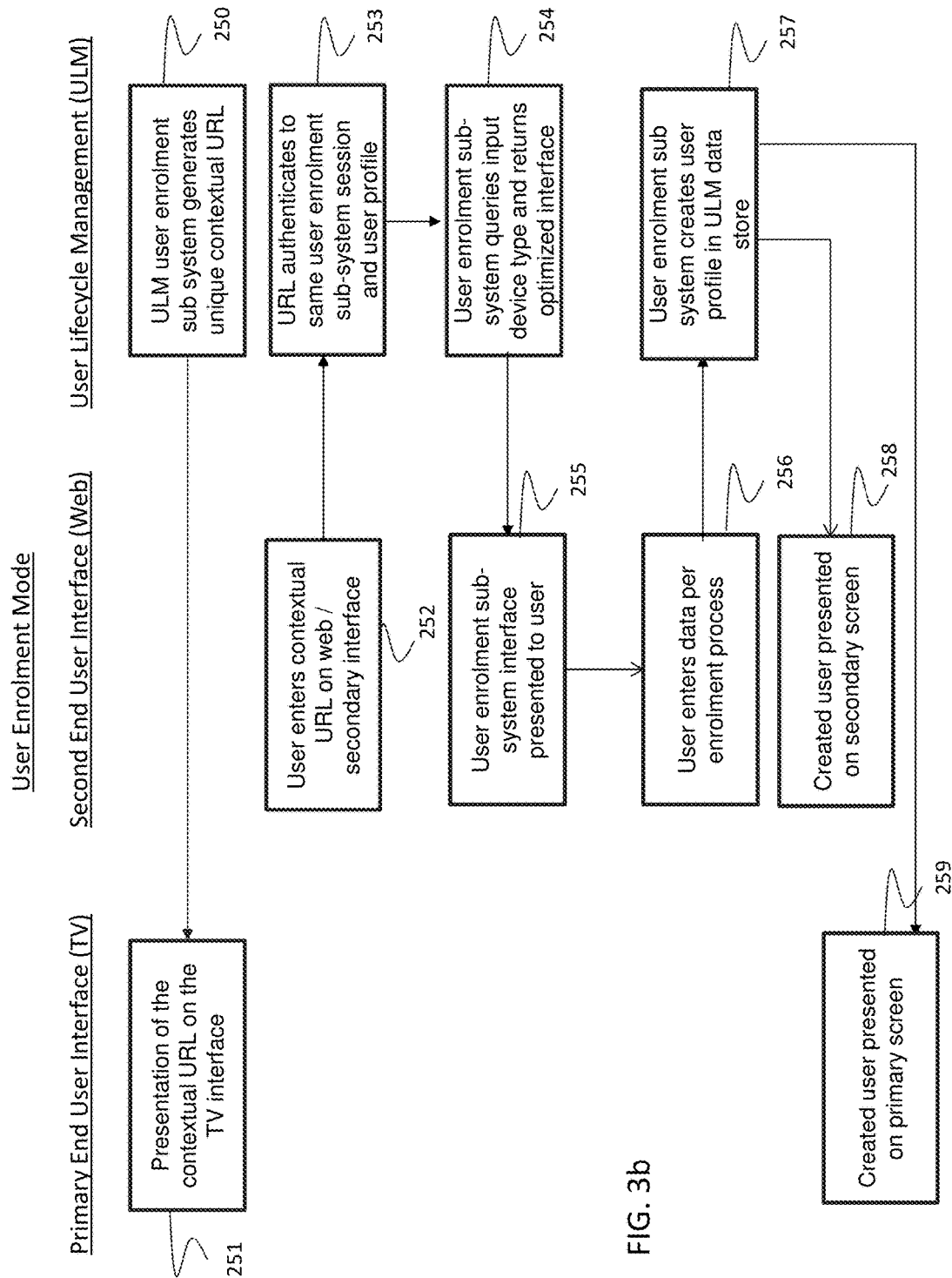
FIG. 3b. is a flow diagram depicting user enrolment sub system processes to enable user enrolment using two interfaces that contemporaneously interact with the enrolment sub system.

FIG. 3b presents the user enrolment sub-system processes for presenting an optimized secondary input interface and for the support of two devices 18 contemporaneously interacting with the user enrolment sub-system 11.

In step 251, the user is presented with a URL by user enrolment 11 which ULM user enrolment dynamically generates based on attributes/constraints of the input device 18 and enrolment context. The user may then in step 252 navigate to that URL via another input device. In step 253, the secondary enrolment device registers itself to the user enrolment session already underway in 251, and ULM Bidirectional Messaging sub system 15 acts as a go-between to present on the primary user interface in FIG. 2a, any input information entered on secondary screen FIG. 3a. Based on the secondary input device used in step 252, user enrolment 11 presents an optimized interface in step 254 that accommodates for device type and stage in the enrolment process, to minimize enrolment steps and maximize usability. In step 256 the user enters data as prompted by user enrolment 11, which is stored in ULM data store 27 in step 257. Step 27 also encapsulates the completion of the user enrolment process. Following step 257, the created user is shown on FIG. 3a in step 258, and data is also contemporaneously sent to primary user interface 2a using ULM bi-directional messaging sub-system 15 and presented on user interface at 259.

Figure 3C:
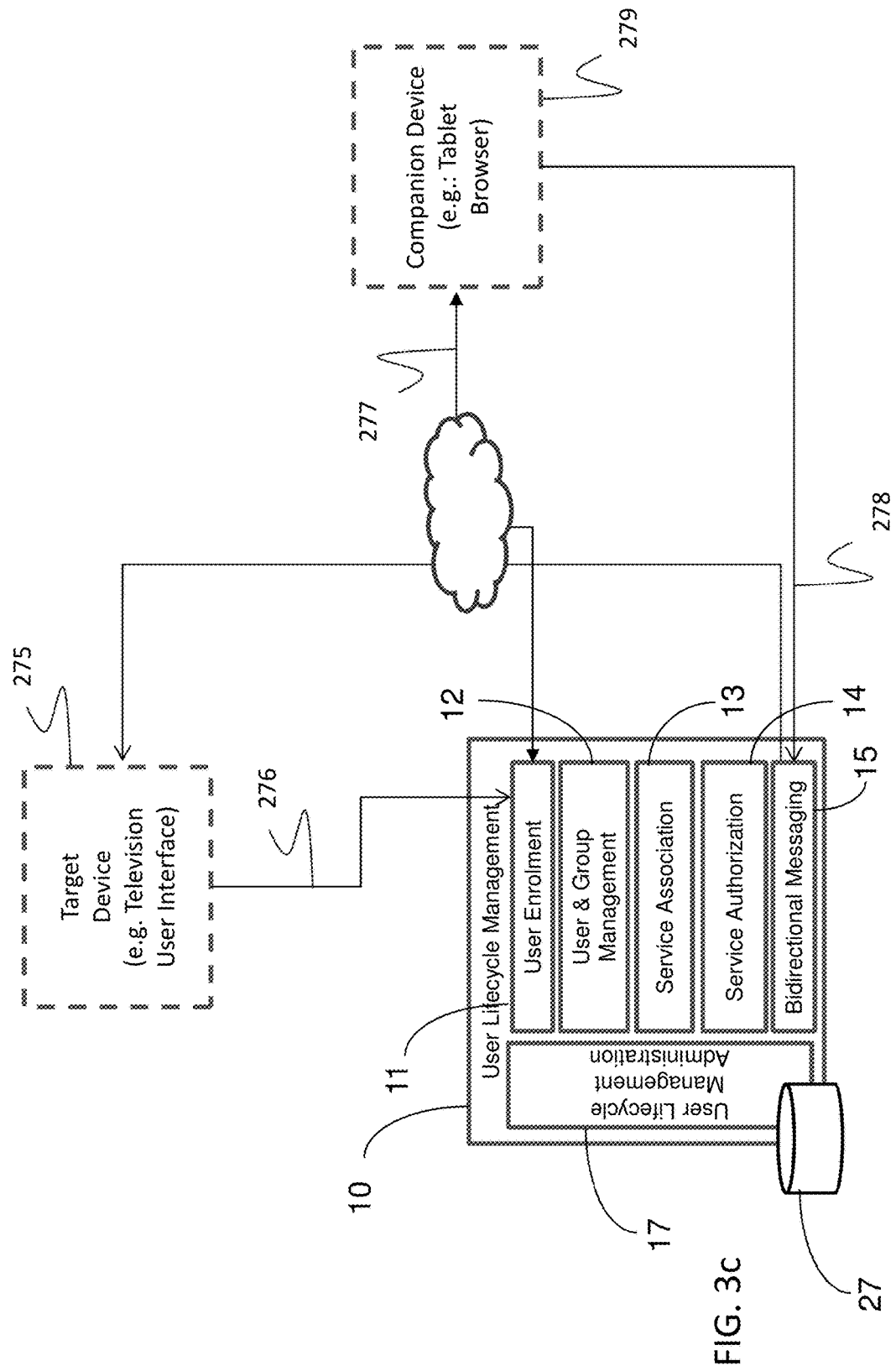
FIG. 3c. is a block diagram showing interactions between two interface devices that communicate contemporaneously with the system and with each other via the system.

FIG. 3c shows the ULM system 10's use of the bi-directional messaging sub-system 15 to facilitate the interaction between a primary enrolment device 275 and a secondary device 279. In the example shown, the primary enrolment device 275 is a set-top box with remote control apparatus and the secondary device is a web-browser enabled device with a fully functioning input keyboard 279. When the user is presented with a URL 104 generated by user enrolment sub system 11, on device 275 via connection 276, they may open a web browser on secondary device 279. The entered URL on device 279 directs the browser to user enrolment 11 via connection 277. User enrolment 10 also engages Bidirectional messaging sub-system (BMS) 15 to allow input from device 279, to be received by BMS 15 via connection 278 and to be pushed forward by BMS 15 to device 275 via connection 276. This can greatly simplify user enrolment processes for users with limited input apparatus such as TV set top remote controls.

Hierarchy View and Policy

Figure 4A:
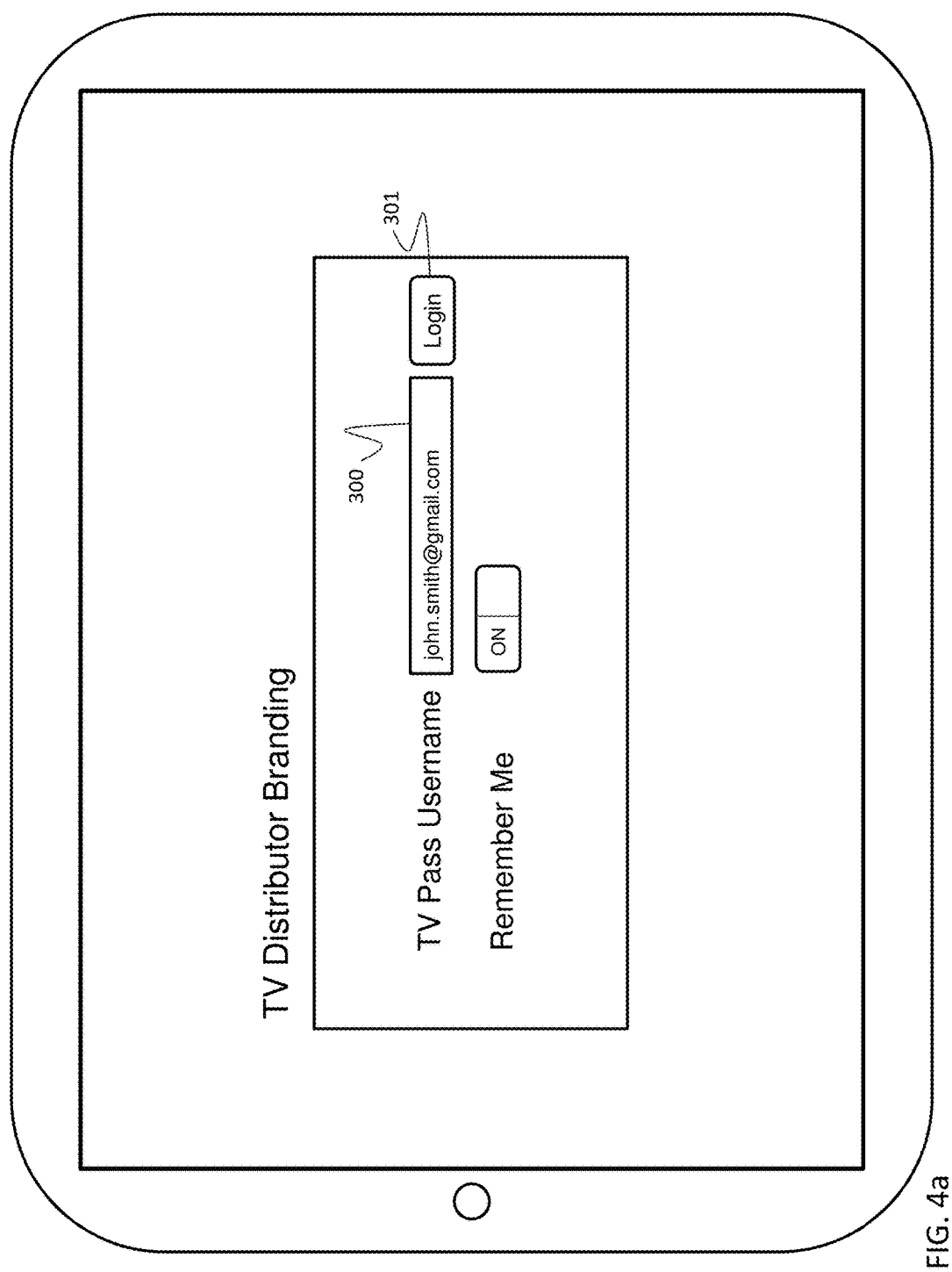
FIG. 4a. shows a TV distributor application authentication interface that may be used to access a group and hierarchy management interface in one aspect of the system.
Figure 4B:
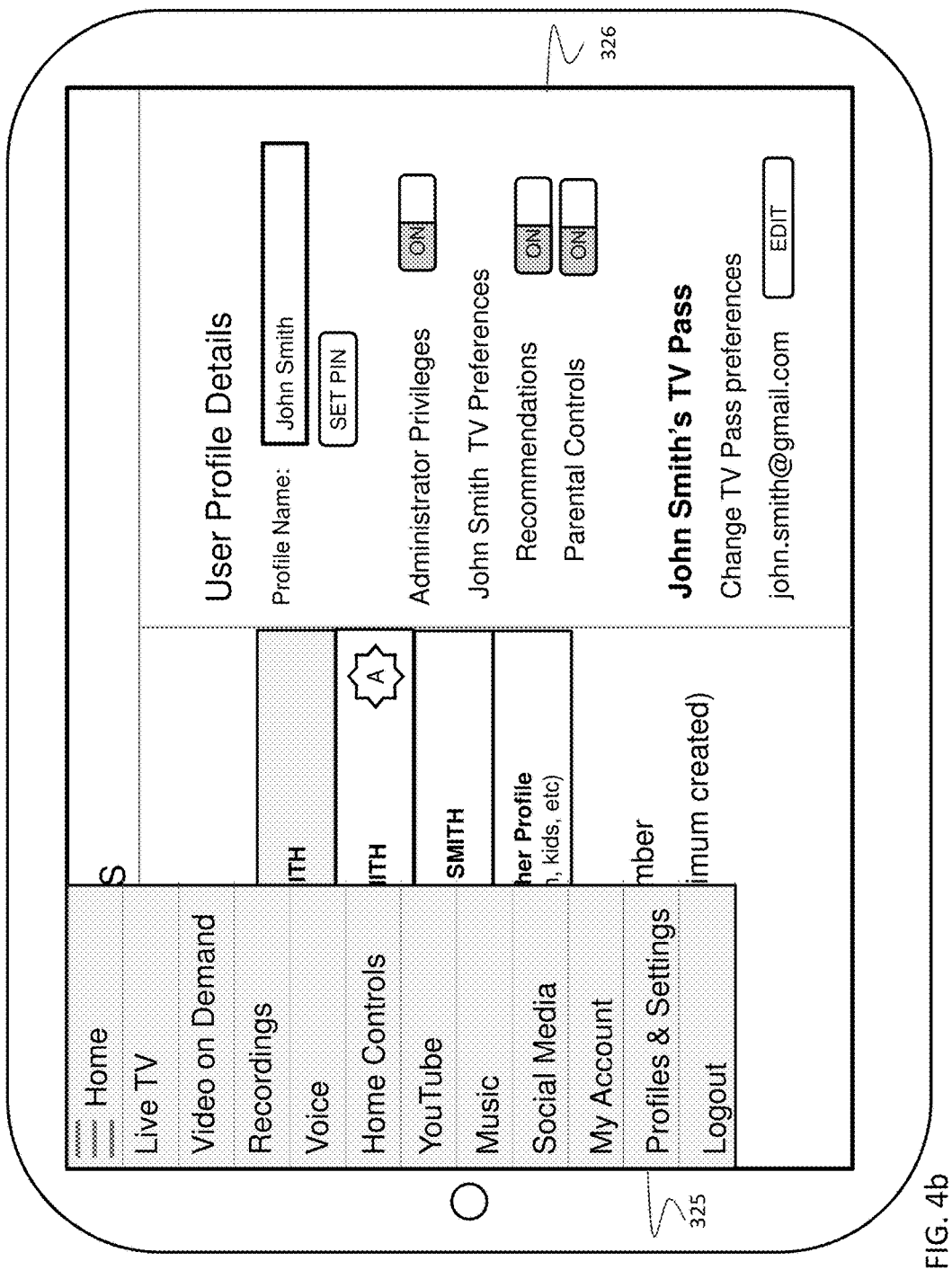
FIG. 4b. shows a TV distributor application menu interface that may be used to access a group and hierarchy management interface.
Figure 4C:
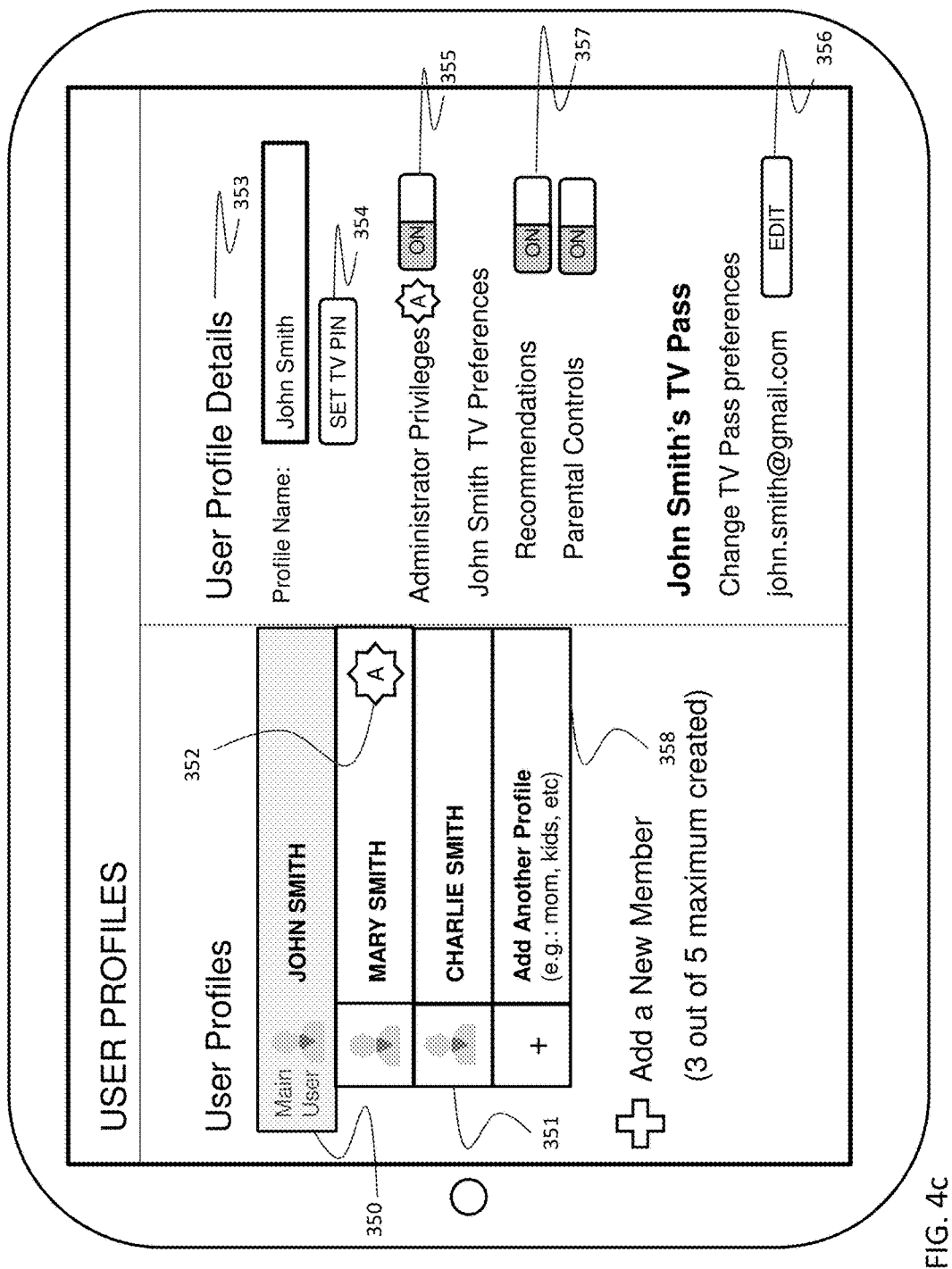
FIG. 4c. shows a TV distributor application interface for managing profiles within a TV household viewing hierarchy in one aspect of the system.

Once users are created, the user and group management sub-system 11 provides for the secure view and management of the household hierarchy based on configured permissions and credentials of each user in the hierarchy. As shown in FIGS. 4a-4c, the user lifecycle management system 10 dynamically modifies the presentation of the user hierarchy and a specific user's ability to modify profiles based on the relationship of that user with the TV distributor, and the relationship of the user with other members of the TV viewing hierarchy.

FIG. 4a shows a TV distributor's application running on an unmanaged device, which in contrast to the interface and processes described in FIGS. 2a and 2b, cannot provide to user lifecycle management 10 or other systems, the account or user associated to the TV distributor's application session. In this embodiment, a user provides their profile credentials in field 300 and authenticates to a session by selecting visual marker 301. When a user provides their authentication details, this data is passed to Service Authentication and Authorization 14, which verifies the user's credentials, and also verifies the user's hierarchical role and privileges in user and group management 12, prior to authenticating the user.

Following the authentication to the TV distributor's application, the user is presented with the various services associated with their profile in FIG. 4b, and also have the option to manage their user profile settings. This is shown in the example via a user selecting the Profiles and Settings visual marker 325. When a user selects this menu option, an interface is returned that leverages ULM 10 to allow a user to manage their profile and settings.

When a user arrives at the user profile and settings interface as shown in FIG. 4c, user and group management 12 verifies based on the authenticated user, what hierarchical view to present. In this embodiment, the authenticated user is the primary user, and in turn, user and group management 12 dynamically generates a full permissions view of the household viewing hierarchy. The interface generated by the user and group management 12 provides visual markers for the primary user, with a larger display window for that user, and a displaced alignment of the user's profile marker to indicate the top-level place in the hierarchy 350. Users that are not the primary user are shown in a uniformly aligned manner below the primary user 351. Additional privileges governed by user and group management 12, including delegated authority, are shown via additional visual markers embedded into the hierarchy 352.

In addition, user and group management 12, determines based on the authenticated user, which other users are either viewable and/or editable by the authenticated user. In this embodiment, the bold text and visual display of the secondary users 351 indicates that the authenticated user may navigate, view and edit the preferences of the other users in the household. Note that a user may only be able to edit certain preferences of other user profiles, depending on the preferred embodiment of the invention.

The example illustrates that the authenticated user's profile as managed in group and hierarchy management 12 allows various functions, including the creation of a new profile 358, the view of the authenticated user's profile details 353 and the management of the authenticated user's TV preferences 357. The user may also select visual marker 356 to further personalize their profile depending on the preference of the TV operator.

Figure 4D:
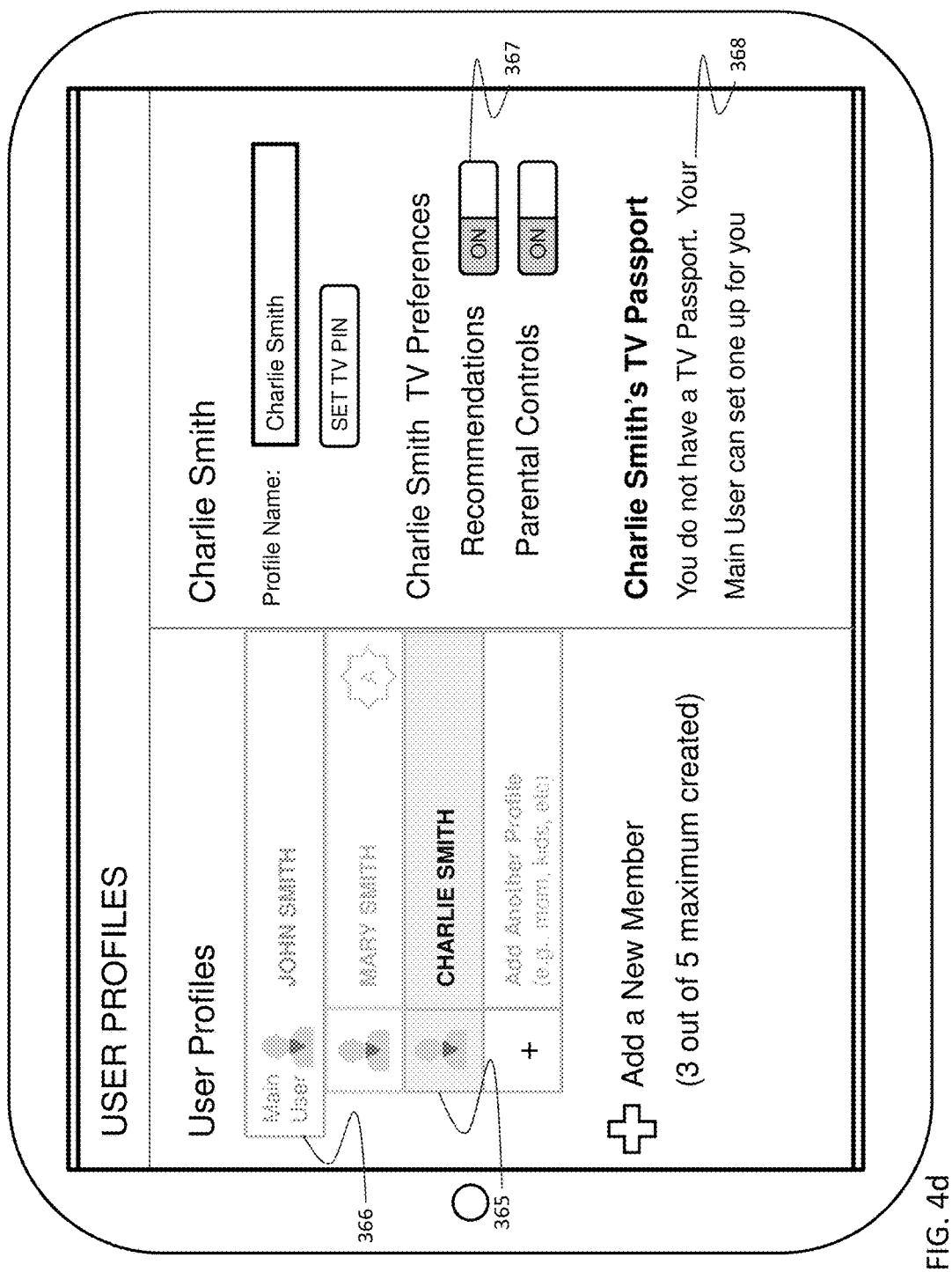
FIG. 4d. shows another TV distributor application interface for managing profiles within a TV household viewing hierarchy in one aspect of the system.

In contrast, if another user has authenticated to the TV distributor's application, their view may be different based on the dynamic presentation generated by group and hierarchy management 12. As shown in FIG. 4d, a secondary user that does not have delegated administrative privileges and is not a main user, will be presented an interface that allows the viewing of the hierarchy, but does not allow the same navigation or modification privileges as allowed by the primary user as shown in FIG. 4c. In this embodiment, the authenticated user 365 is presented with other members visually shaded out, 366, whereby this presentation is dynamically generated by user and group management 12. In addition, the profile details and ability to manage the profile details are limited. TV preferences 367 in this scenario are viewable but not editable by the authenticated user. Additional profile details 368 may or may not be accessible based on the TV distributor.

Figure 4E:
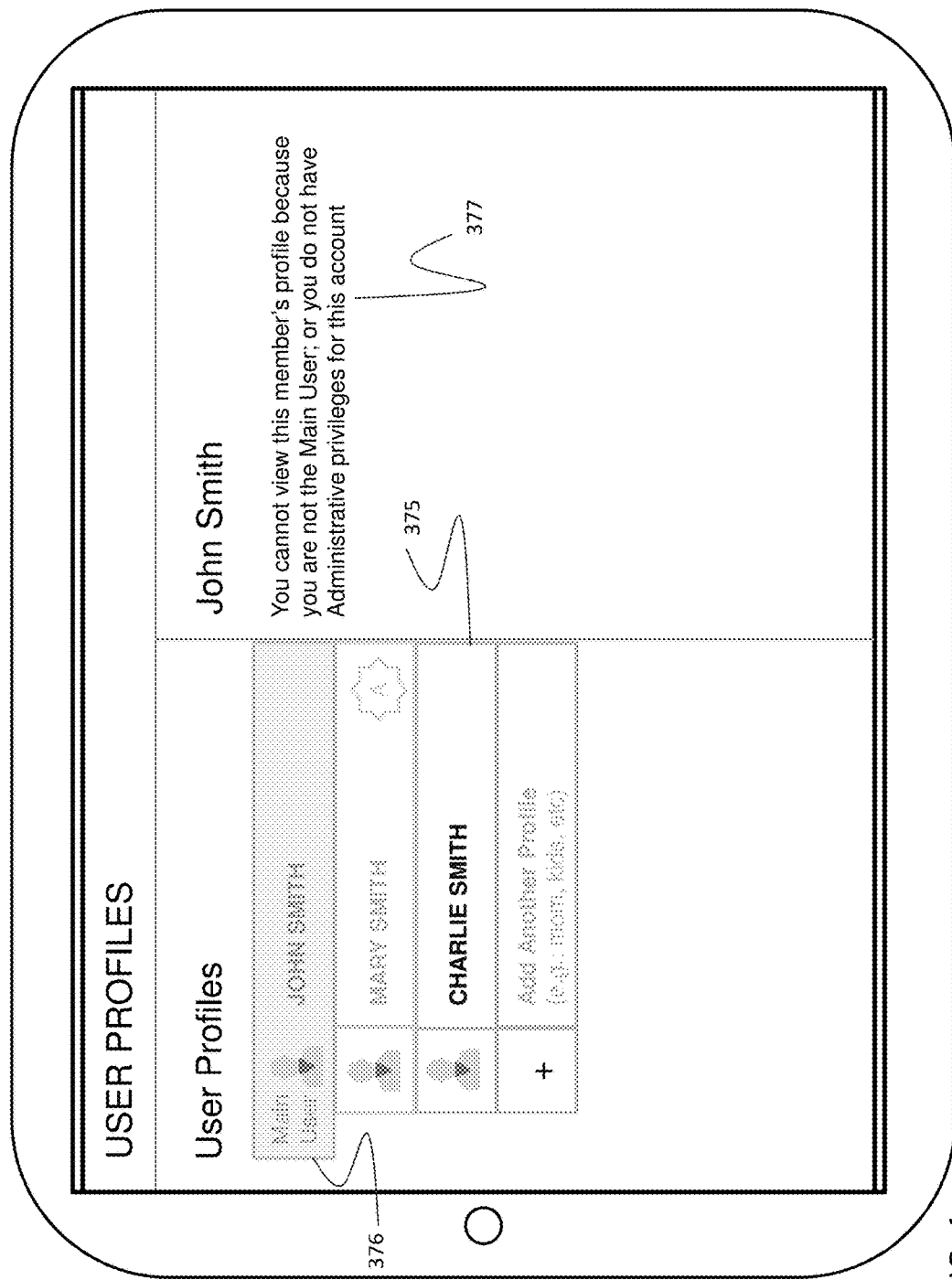
FIG. 4e. shows yet another TV distributor application interface for managing profiles within a TV household viewing hierarchy in one aspect of the system.

FIG. 4e further illustrates the user and group management privacy and permissions engine dynamically preventing a view of a primary user by a secondary user based on the authenticated user's role in the hierarchy. Authenticated user 375 is navigated to view the profile of primary user 376. User and group management dynamically presents privacy notification 377 based on the TV distributor's preferred embodiment.

Figure 4F:
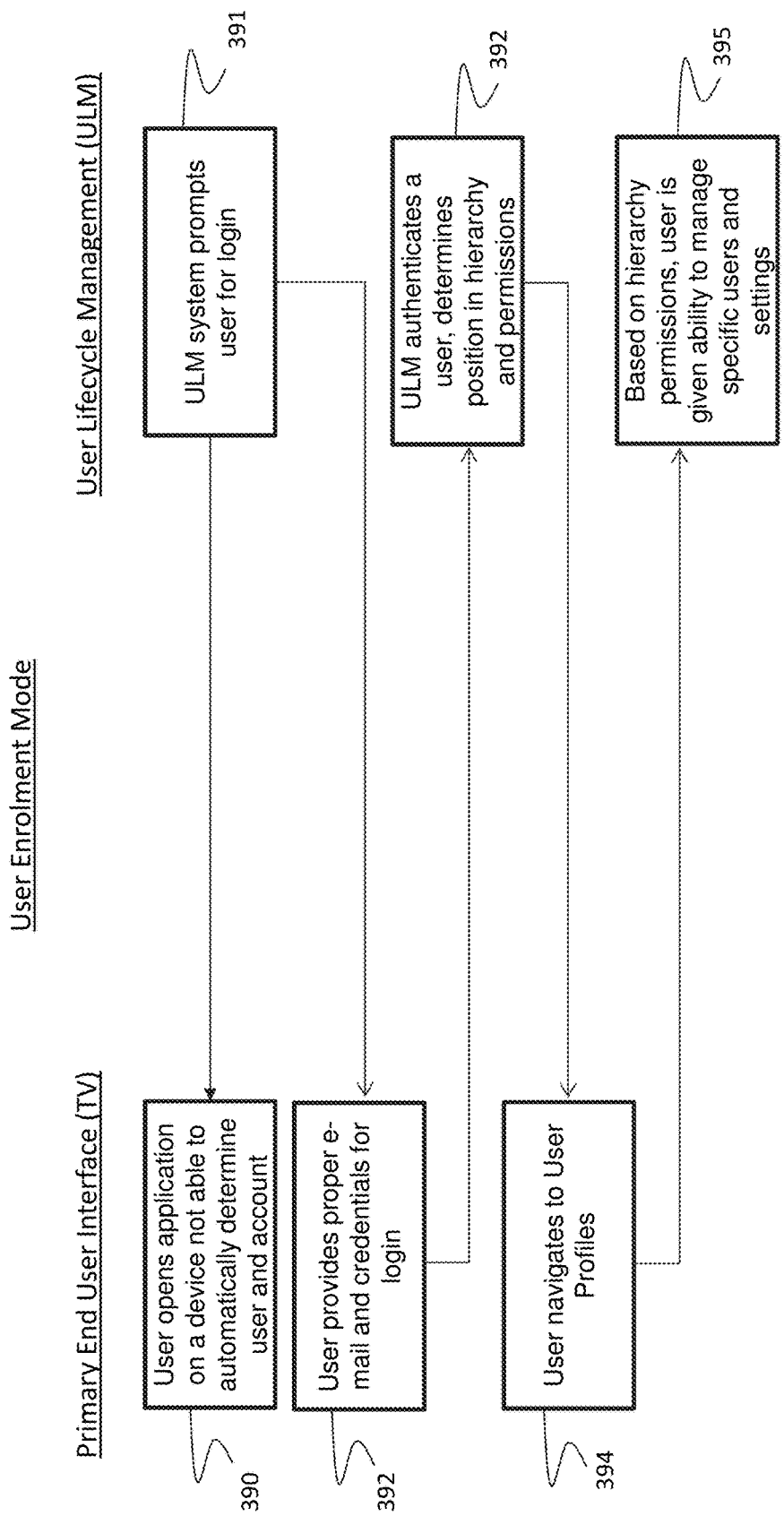
FIG. 4f. is a flow diagram depicting user and group management sub system processes to dynamically adapt hierarchy view and administration privileges based on a user's role in the hierarchy.

FIG. 4f is a flow diagram depicting the processing performed by user and group management 12 to present a hierarchical view based on the authenticated user, and to allow a specific set of profile view and management tasks for that user based on their role in the hierarchy as shown in FIGS. 4a-4e. In this embodiment a user initially opens a TV distributor application which cannot automatically determine the account or user wishing to access the distributor's services in step 390 and therefore user and group management 12 presents the end user with an authentication screen in step 391. In step 392 the user provides successful credentials which are then used by user authentication and authorization 14 to grant access to the user to the TV distributor application, but more importantly in this example, this data is processed by user and group management 12 to determine the hierarchical view and hierarchy and profile management privileges to be granted to the user in step 393. In step 394 the user navigates to the user profile and settings interface, which invokes user and group management sub system at 395 to present the hierarchy with visual markers and navigation and management capabilities unique to that user.

Service Association Mode

Figure 5A:
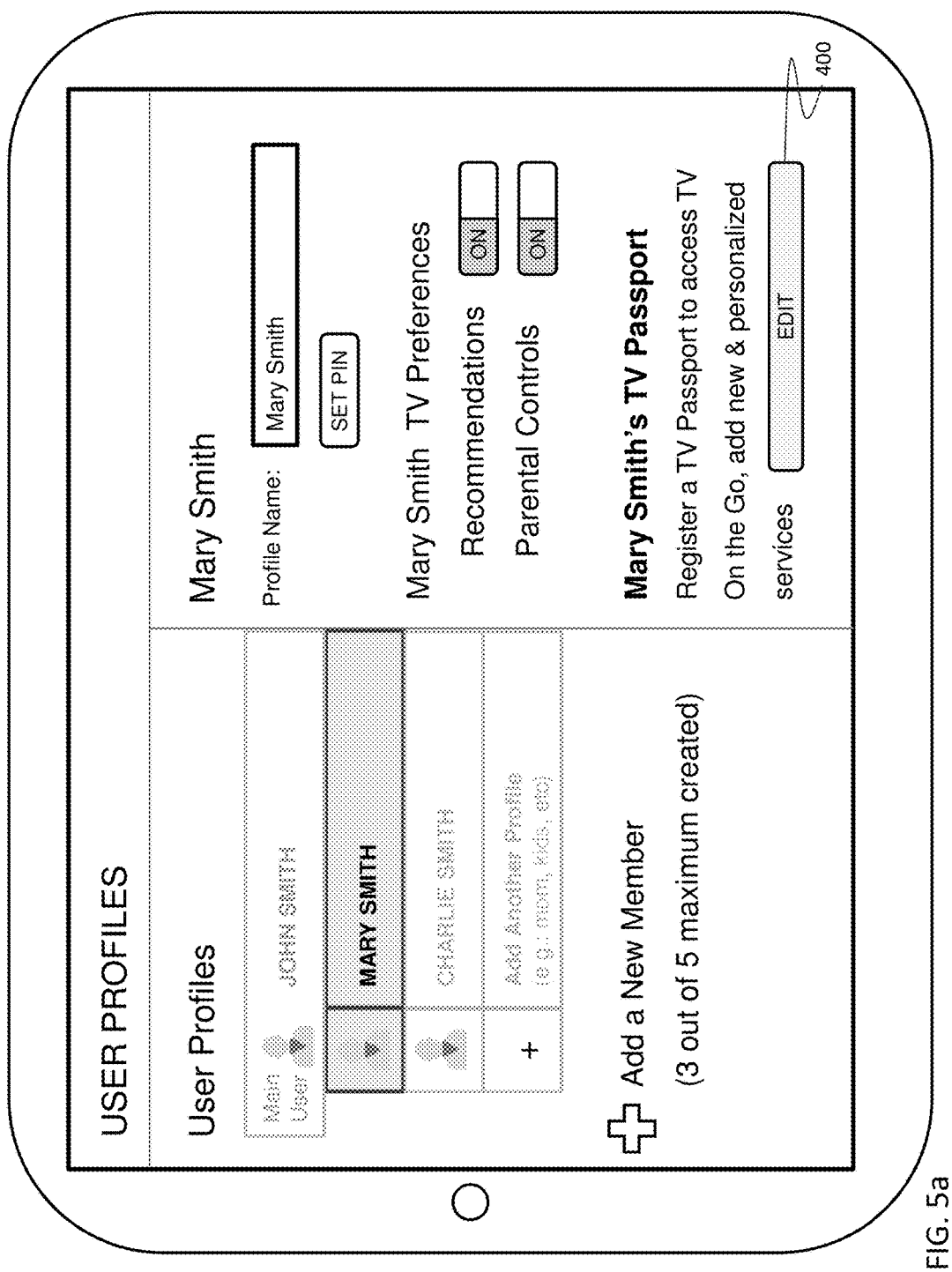
FIG. 5a. shows a service association sub system interface that appears on a television screen in one aspect of the system.

When a user wishes to associate TV distributor non-video and other third party services to their profile, they may do so by selecting a visual marker to navigate to the service association 13 functions interface, shown in FIG. 5a in this example as visual marker 400.

Figure 5B:
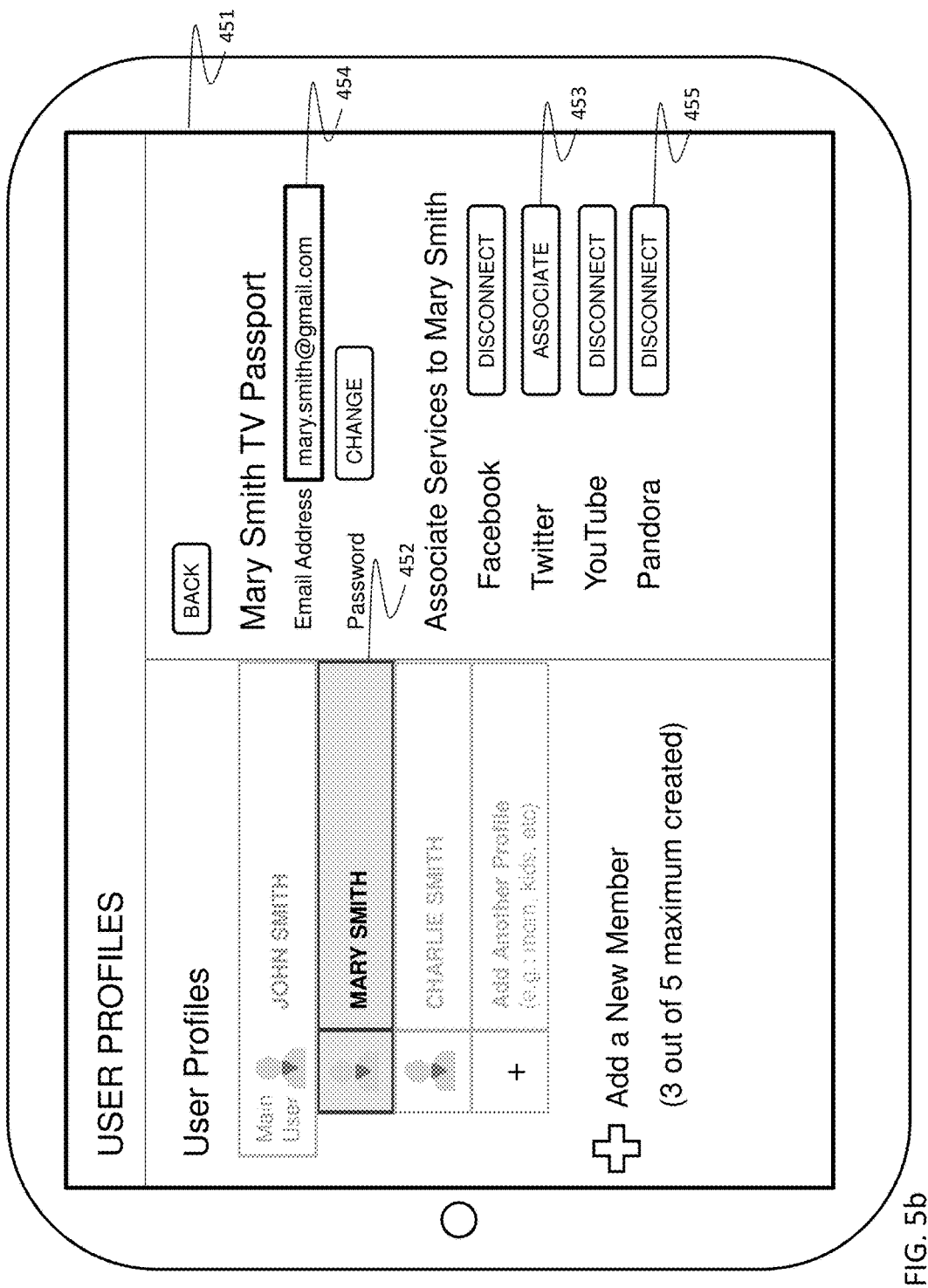
FIG. 5b. shows another service association sub system interface that appears on a television screen.

In FIG. 5b, following the navigation to Service Association user interface, the access to which is governed by user and group management 12, the user may elect to associate their user profile with any number of additional services as shown in the Associate Services 451 interface. Selecting an association 453 or dissociation 455 visual marker services invokes service association sub-system 13 which processes the request for association and dissociation by prompting a user to provide the identity and authentication credentials for that specific service. All of the associations are federated by Service Association 13.

Figure 5C:
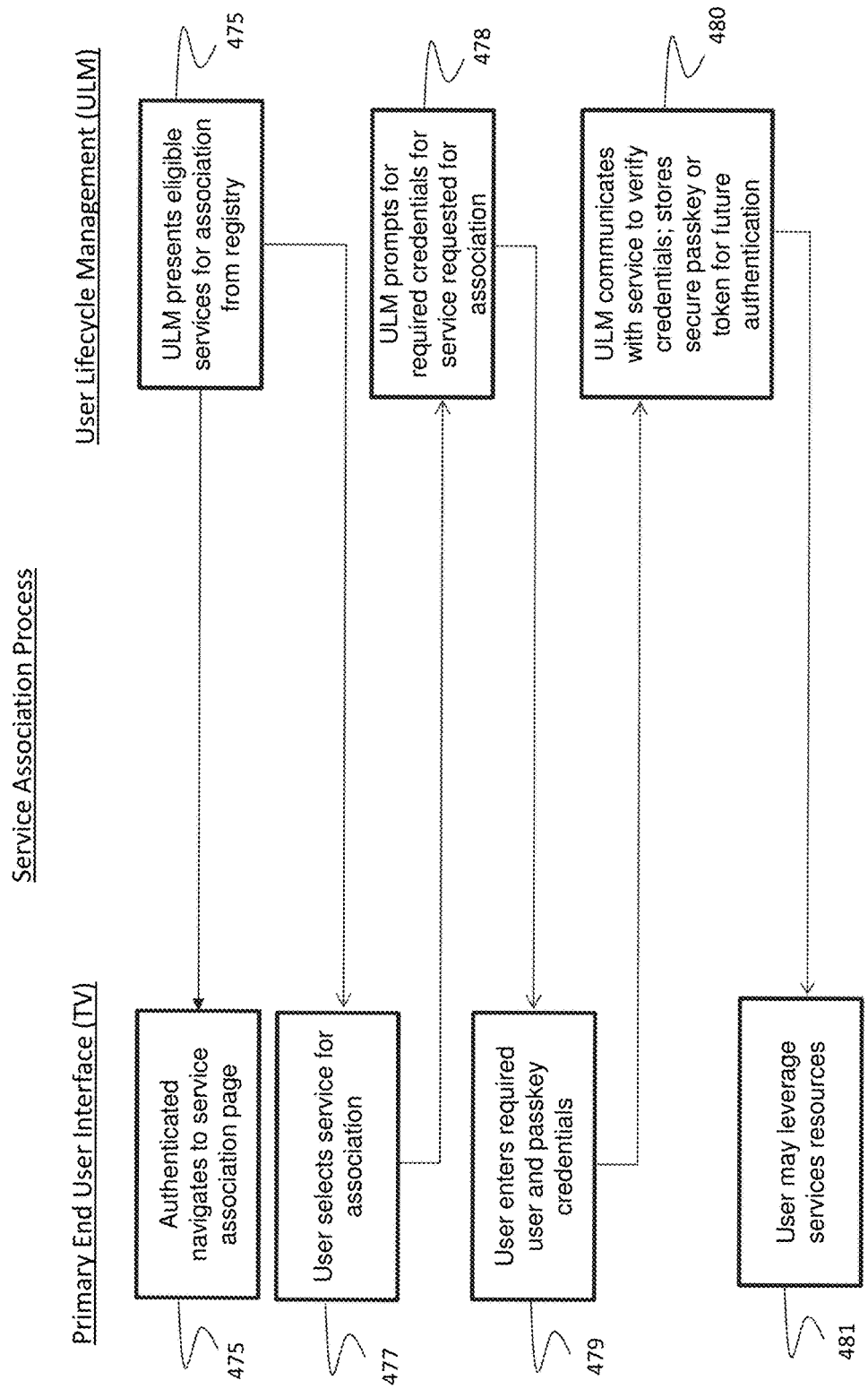
FIG. 5c. is a flow diagram detailing service association management sub system processes that govern the association of third party services to the a profile.

FIG. 5c is a flow diagram depicting the processing carried out by Service Association sub-system 13 in response to a user selecting the visual marker 453 to associate to a specific service. In step 475 an authenticated user navigates to the service association interface, which triggers the service association sub system 13. The service association sub system 13, in step 475, determines which services are eligible for association to the authenticated user from the service registry in service association sub system 13. The list of services eligible for association is then sent to the user interface in step 475 an authenticated user navigates to the service association interface, which triggers the service association sub system 13. The service association sub system 13, in step 475, determines which services are eligible for association to the authenticated user from the service registry in service association sub system 13. The list of services eligible for association will then be sent to the user interface in step 477, from which an authenticate user selects the service for association. By selecting the service for association in step 477, the service association sub system queries the underlying service and return the user a prompt to enter the user and credential information associated with that service, in step 478. The user then inputs the appropriate data in the primary user interface in step 479. This data is received by the service association sub system 13, which leverages an internal federation and authentication component to broker the authentication and authorization of that service in step 480. To ensure that future interactions with the associated service do not require duplicate authentication, service association sub system 13 can store a token or similar credential for future access to the service. Once the association has been completed in step 480, the user may seamlessly consume features associated with that service in step 481.

User Lifecycle Management Administration Mode

Figure 6A:
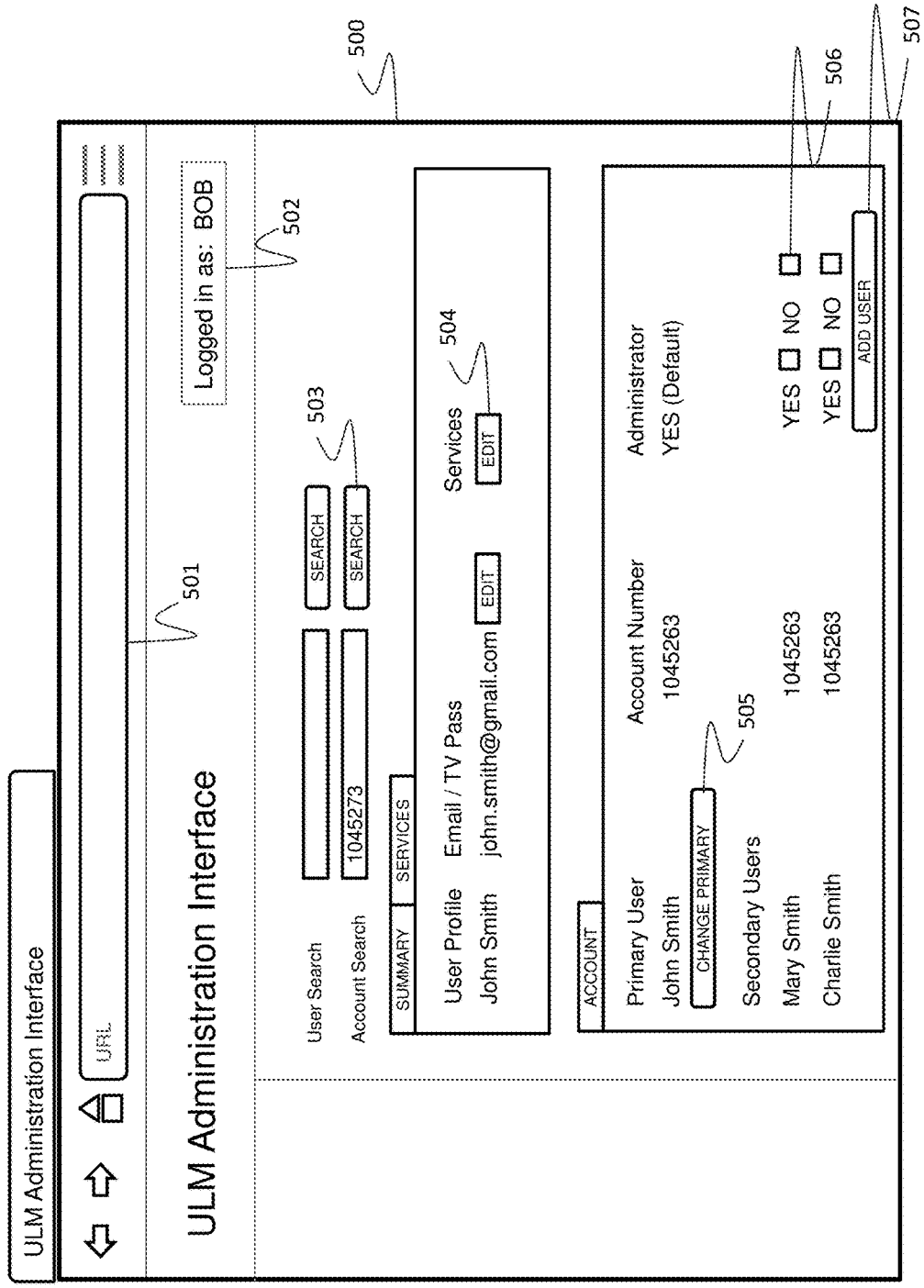
FIG. 6a. shows a user lifecycle management administration sub system interface that appears on a TV distributor computer screen for the authorized $3^{rd}$ party management of user profiles in one aspect of the system.

The TV distributor may wish to manage the user profiles for a TV viewing household on behalf of a user, or view the details of a given household and their TV viewing hierarchy of user profiles. FIG. 6a shows an interface whereby the operator may access the User Lifecycle Management Administration functions 17 via a ULM administration interface 500. This interface is accessed by a TV distributor customer service representative 502 after providing username and password credentials as preferred by the TV distributor. Following authentication to the interface, the customer service representative may query users resident in ULM data store 27 via a query interface 503 which returns users with their profile details. The customer service representative may EDIT these user profiles using visual markers 504 which invokes the various user lifecycle management 10 sub-systems for processing actions including user enrolment 11, user and group management 12, service association 13. The customer service representative also has administrative privileges that allow management of all users including privileges beyond that of top-level primary users. These privileges including the change of primary users 505, the association of services to any user 506 and the addition of users of any time 507. These privileges are stored and processed by User Lifecycle Management Administration 17.

Figure 6B:
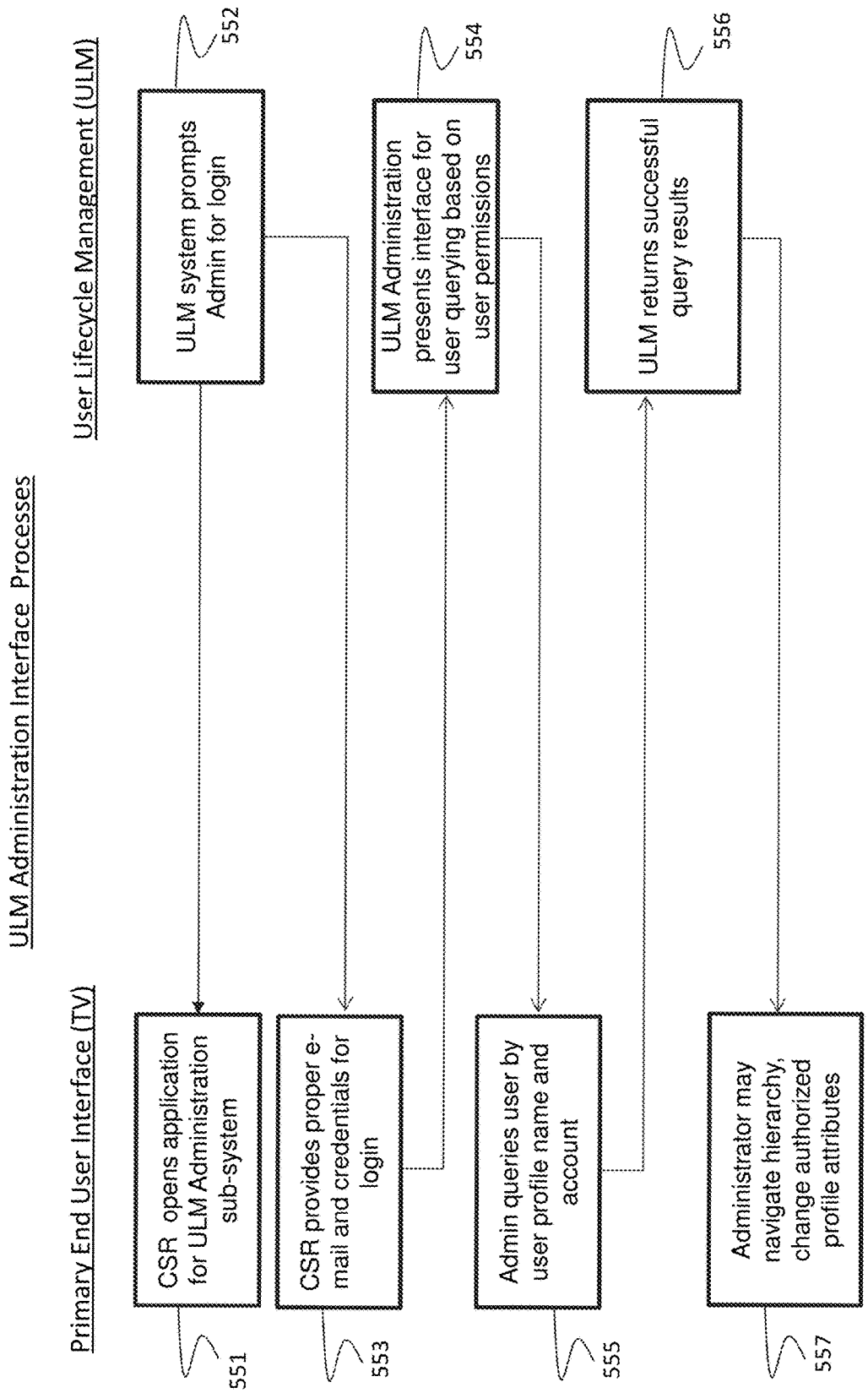
FIG. 6b. is a flow diagram detailing the user lifecycle management administration sub system processes for managing a user profile.

FIG. 6b is a flow diagram depicting the User Lifecycle Management Administration sub system 17 methods invoked by the user interface illustration in FIG. 6a. In step 551 the user starts the ULM Administration 17 sub system by navigating to a URL. The ULM Administration sub system 17 presents an authentication screen to the end user in step 552. In step 553 the customer service representative provides the appropriate credentials, which in step 554 are verified by the ULM Administration sub system 17. Here, the ULM sub system 17 determines the privileges of the customer service representative to be allowed to administer a group of households based on the preference of the TV distributor. In this manner the ULM Administration sub system 17 designates the customer service representative as a pseudo-user with a hierarchical role that is superior to that of a primary user. Following authentication the customer service representative may query the ULM Administration sub system 17 in step 555 which will search ULM data store 27 for users according to various attributes including account and user profile identifiers. Any matching results are returned in step 556. Following the return of results, the customer service representative may view and manage users in the hierarchy.

User Lifecycle Management Administration—Global Settings

Figure 7:
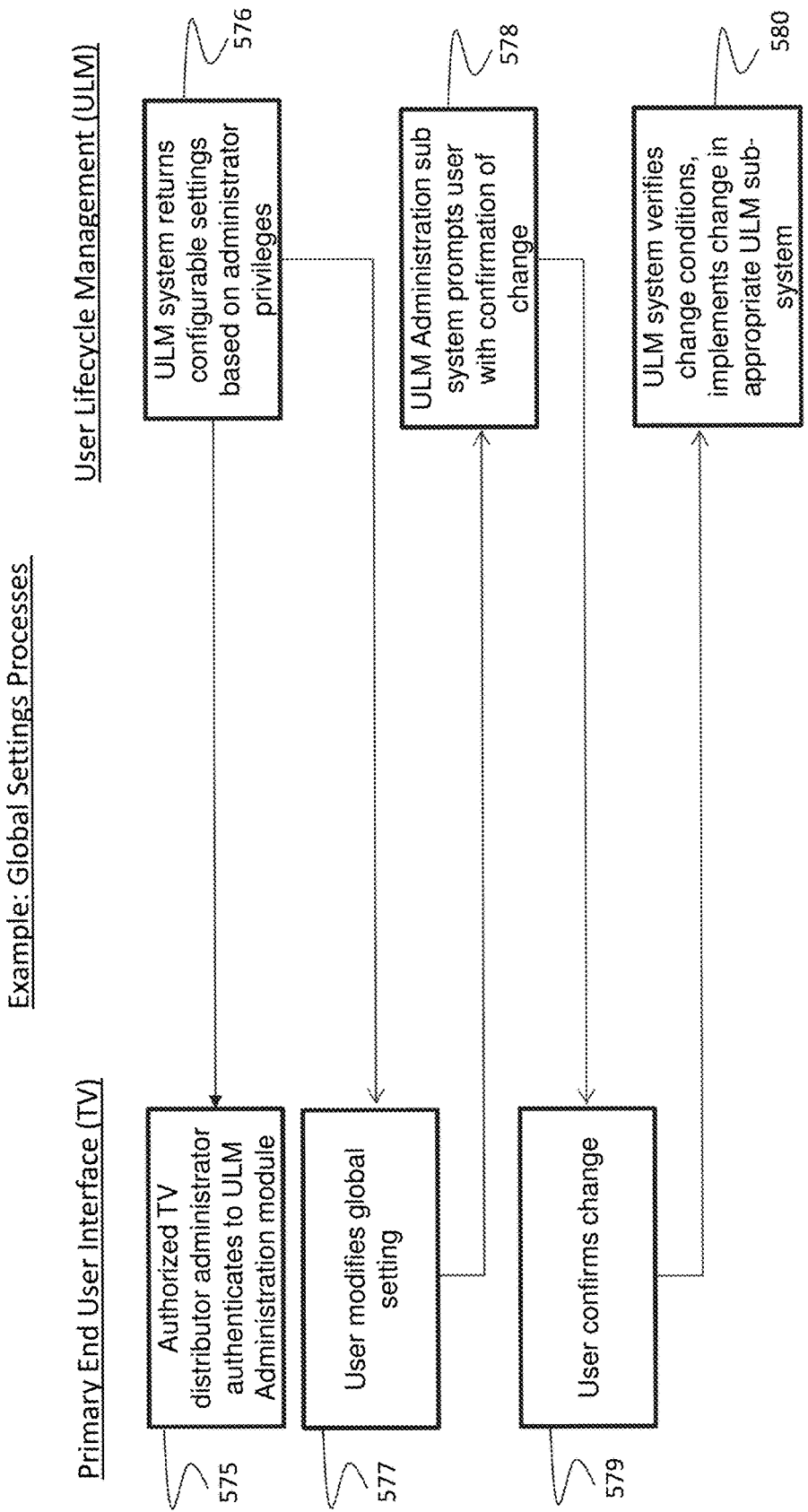
FIG. 7. is a sequence flow diagram detailing the user lifecycle management administration sub system processes for setting a global parameter.

FIG. 7 is a sequence flow diagram depicting the processes performed by the ULM Administration sub system 17 to manage global ULM system 10 settings. In step 575, a TV distributor administrator authenticates to the ULM Administration sub system 17. Based on the administrator user and password credentials, the ULM sub system 17 authorizes global ULM setting configurations in step 576. Either via a user interface or via an application programming interface, in step 577, the administrator may configure global parameters in the ULM sub system 17, that allows the TV distributor to establish policies in user enrolment 12, user and group management 13, service association 14, service authentication and authorization 15 and in general, in ULM system 10. ULM Administration sub system 17 prompts the user to confirm the change in step 578. Following confirmation of the change, ULM Administration may check database entries that conflict with the changed policy and return an error, in step 580. Also in step 580, once conflicts are resolved, or ignored, the global setting is placed into effect by the ULM Administration sub system 17 and enforced by the appropriate sub system.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems 10, 19, 20, 22, 23, 24 user device 18, etc., or any component of or related to or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of allowing members of a media consuming location to create individual user profiles using a plurality of input devices, the method comprising:

detecting a device from which a user is initiating an enrollment session to create an individual user profile, wherein the detecting is by an intermediary disposed between the device and a media service distributor that provides at least one media service to one or more devices at the media consuming location;

determining, by the intermediary, a billing account, by querying at least one of a user lifecycle management database for the intermediary, an operator identity management system for the media service distributor, or the device;

querying the media service distributor, by the intermediary, to verify the billing account;

determining, by the intermediary, whether or not existing user profiles exist for the billing account and presenting data representing such user profiles to the device, when retrieved;

when instructed to continue creating a new individual user profile, determining, by the intermediary, whether or not account information is accessible via interfaces with at least one of the user lifecycle management database, the operator identity management system, or the device;

using, at the intermediary, the determined account information and device type to adapt steps required to complete the enrollment session to remove or augment at least one operation required to complete an enrolment of the user based on what is determined by the intermediary, to enable one of a plurality of enrolment session types;

enabling, by the intermediary, the enrolment of the new individual user profile using an adapted enrollment session that removes or augments the at least one operation; and storing a new individual user profile for the billing account.

2. The method of claim 1, further comprising using the intermediary to intercept the enrollment session to enable a plurality of devices to be used to adapt the steps required to complete the adapted enrollment session.

3. The method of claim 2, wherein the adapted enrollment utilizes more than two devices, and wherein the intermediary maintains a singular context of the user in the enrollment session.

4. The method of claim 1, wherein the contextual information used for the user enrolment session is determined by the intermediary from at least one of information related to the user and information related to one or more devices utilized by the user for the enrolment.

5. The method of claim 4, further comprising querying at least one input device to determine the contextual information, wherein the intermediary generates an optimized user interface accordingly.

6. The method of claim 1, wherein a plurality of user devices are enabled to be used in the enrolment, the method further comprising the intermediary generating an optimized user interface according to the contextual information and providing the optimized user interface to the plurality of user devices.

7. The method of claim 1, wherein a plurality of user devices are enabled to be used in the enrolment, the method further comprising utilizing a bi-directional messaging component to facilitate data flow between the plurality of user devices.

8. The method of claim 1, further comprising enabling at least one user profile to be associated with one or more non-video services offered by the media distributor.

9. The method of claim 1, further comprising enabling at least one user profiled to be associated with one or more services offered by an entity other than the media distributor.

10. The method of claim 1, further comprising allowing media distributor administrators to manage user profiles and user settings by:

enabling creation of at least one administrative user;

enabling the at least one administrative user to perform at least one of managing, creating, and viewing user profiles created for television viewing locations according to an administrative level assigned to the at least one administrative user; and enabling the at least one administrative user to configure settings related to an enrolment of a user.

11. The method of claim 10, wherein the settings comprise any one or more of policies, a hierarchy, and an association to other system parameters.

12. The method of claim 10, further comprising enabling at least one of user interface access and application programming interface (API) access to manage user profiles and user settings.

13. The method of claim 10, further comprising enabling the at least one administrative user to participate during an enrolment process.

14. The method of claim 1, further comprising:

generating, at the intermediary, a user hierarchy that includes the enrolled user, based on relationships between a plurality of user profiles including a profile for the enrolled user, according to a relationship with the media service distributor and relationships between the plurality of user profiles.

15. The method of claim 14, further comprising enabling delegation of privileges associated a role in the hierarchy to at least one other one of the user profiles.

16. The method of claim 14, wherein permissions and credentials are managed for each member in the hierarchy to protect user profile security related to accessing other user profiles by a particular user.

17. The method of claim 14, further comprising generating a view of the hierarchy and displaying the hierarchy by showing members with hierarchical indentations and visual markers to depict relationships of the user profiles to the television distributor and to each other.

18. The method of claim 1, wherein the device is identified based on an automatically or manually derived identifier.

19. The method of claim 18, wherein the identifier is comprised of any one or more of: a device instance, an IP address, an account number, a username, a token.

20. A non-transitory computer readable medium comprising computer executable instructions for allowing members of a media consuming location to create individual user profiles using a plurality of input devices, comprising instructions for:

detecting a device from which a user is initiating an enrollment session to create an individual user profile, wherein the detecting is by an intermediary disposed between the device and a media service distributor that provides at least one media service to one or more devices at the media consuming location;

determining, by the intermediary, a billing account, by querying at least one of a user lifecycle management database for the intermediary, an operator identity management system for the media service distributor, or the device;

querying the media service distributor, by the intermediary, to verify the billing account;

determining, by the intermediary, whether or not existing user profiles exist for the billing account and presenting data representing such user profiles to the device, when retrieved;

when instructed to continue creating a new individual user profile, determining, by the intermediary, whether or not account information is accessible via interfaces with at least one of the user lifecycle management database, the operator identity management system, or the device;

using, at the intermediary, the determined account information and device type to adapt steps required to complete the enrollment session to remove or augment at least one operation required to complete an enrolment of the user based on what is determined by the intermediary, to enable one of a plurality of enrolment session types;

enabling, by the intermediary, the enrolment of the new individual user profile using an adapted enrollment session that removes or augments the at least one operation; and storing a new individual user profile for the billing account.

21. A system comprising a processor and memory, the memory comprising non-transitory computer executable instructions for allowing members of a media consuming location to create individual user profiles using a plurality of input devices, comprising instructions for:

detecting a device from which a user is initiating an enrollment session to create an individual user profile, wherein the detecting is by an intermediary disposed between the device and a media service distributor that provides at least one media service to one or more devices at the media consuming location;

determining, by the intermediary, a billing account, by querying at least one of a user lifecycle management database for the intermediary, an operator identity management system for the media service distributor, or the device;

querying the media service distributor, by the intermediary, to verify the billing account;

determining, by the intermediary, whether or not existing user profiles exist for the billing account and presenting data representing such user profiles to the device, when retrieved;

when instructed to continue creating a new individual user profile, determining, by the intermediary, whether or not account information is accessible via interfaces with at least one of the user lifecycle management database, the operator identity management system, or the device;

using, at the intermediary, the determined account information and device type to adapt steps required to complete the enrollment session to remove or augment at least one operation required to complete an enrolment of the user based on what is determined by the intermediary, to enable one of a plurality of enrolment session types;

enabling, by the intermediary, the enrolment of the new individual user profile using an adapted enrollment session that removes or augments the at least one operation; and storing a new individual user profile for the billing account.

* * * * *